United States Patent
Nakamura

(10) Patent No.: US 8,503,024 B2
(45) Date of Patent: Aug. 6, 2013

(54) IMAGE PROCESSING APPARATUS AND IMAGE PROCESSING METHOD

(75) Inventor: Yasuyuki Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 622 days.

(21) Appl. No.: 12/809,508

(22) PCT Filed: Dec. 19, 2008

(86) PCT No.: PCT/JP2008/073887
§ 371 (c)(1),
(2), (4) Date: Jun. 18, 2010

(87) PCT Pub. No.: WO2009/082016
PCT Pub. Date: Jul. 2, 2009

(65) Prior Publication Data
US 2011/0164258 A1    Jul. 7, 2011

(30) Foreign Application Priority Data

Dec. 21, 2007  (JP) .................................. 2007-330975
Dec. 12, 2008  (JP) .................................. 2008-317280

(51) Int. Cl.
*G06K 15/02*    (2006.01)

(52) U.S. Cl.
USPC .......................................................... 358/1.2

(58) Field of Classification Search
None
See application file for complete search history.

(56) References Cited

U.S. PATENT DOCUMENTS

2006/0038891 A1*  2/2006  Okutomi et al. ............ 348/222.1
2009/0304258 A1* 12/2009  Hayashi et al. ................ 382/144

FOREIGN PATENT DOCUMENTS

| JP | H07-193690 A | 7/1995 |
| JP | H07-240833 A | 9/1995 |
| JP | H09-18674 A | 1/1997 |
| JP | H09-321948 A | 12/1997 |
| JP | 2002-152525 A | 5/2002 |
| JP | 2006-092450 A | 4/2006 |
| WO | 2004068862 A1 | 8/2004 |

* cited by examiner

*Primary Examiner* — Marivelisse Santiago Cordero
*Assistant Examiner* — Mesfin Getaneh
(74) *Attorney, Agent, or Firm* — Carter, DeLuca, Farrell & Schmidt LLP

(57) ABSTRACT

An image processing apparatus is provided with an area sensor which is formed by arranging sensor components for a pixel in a two-dimensional array and is attached in an inclined manner with respect to a reference installation position. The apparatus has a sensor unit which reads, from the sensor components which are determined based on an inclination angle indicating an inclination of the area sensor from the reference installation position and have been arranged within the area sensor, image data in which the inclination has been corrected; an image obtaining unit which obtains a plurality of frames of image data having a shift of less than one pixel, by scanning an original document image once by the sensor unit; and a high resolution conversion unit which obtains image data with a resolution higher than resolutions of the sensor components by using the obtained image data to perform interpolation processing.

5 Claims, 21 Drawing Sheets

FIG. 2
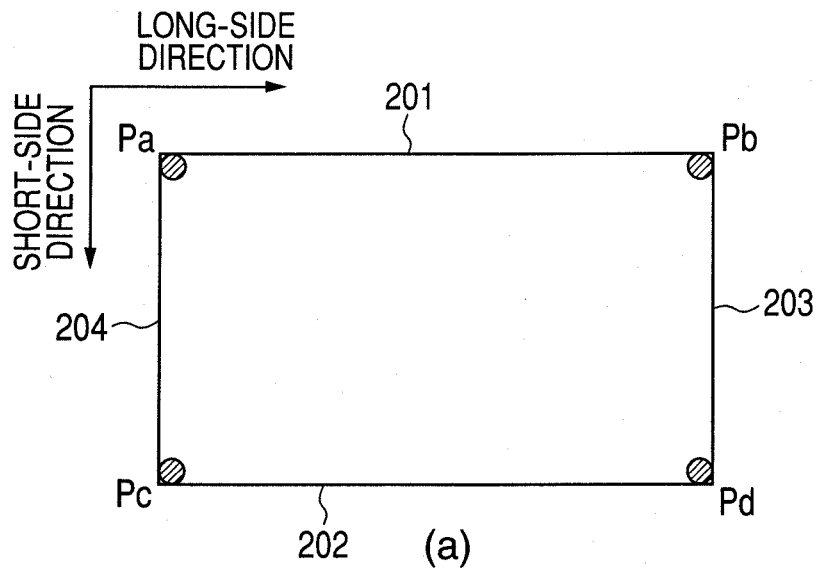
(a)
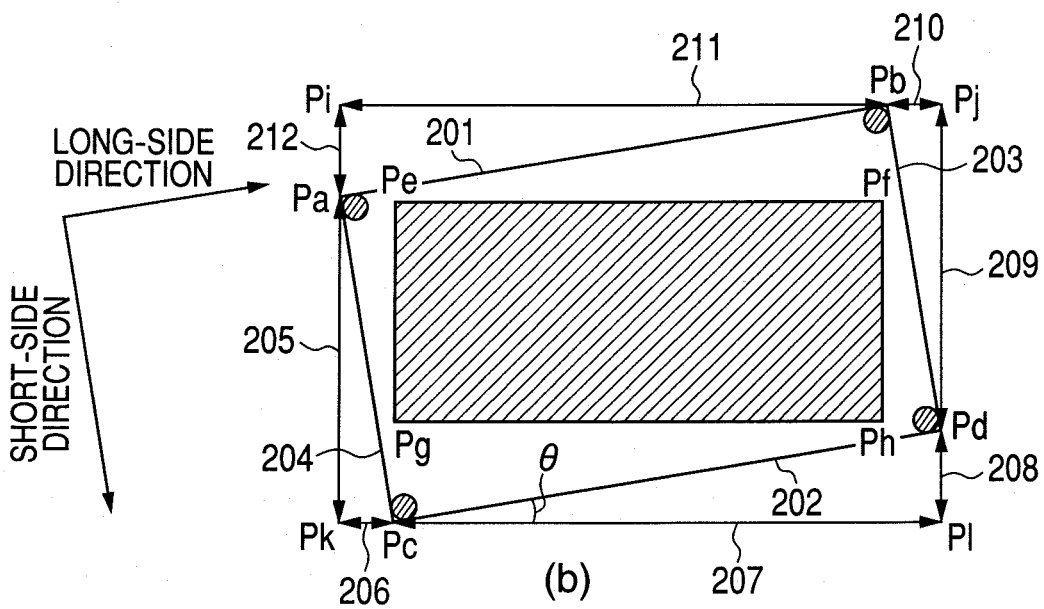
(b)
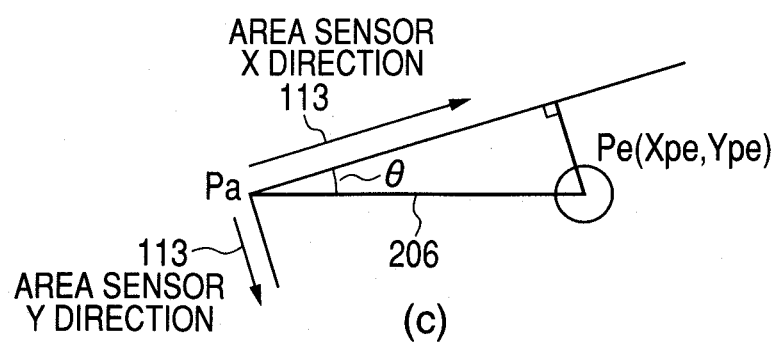
(c)

FIG. 3
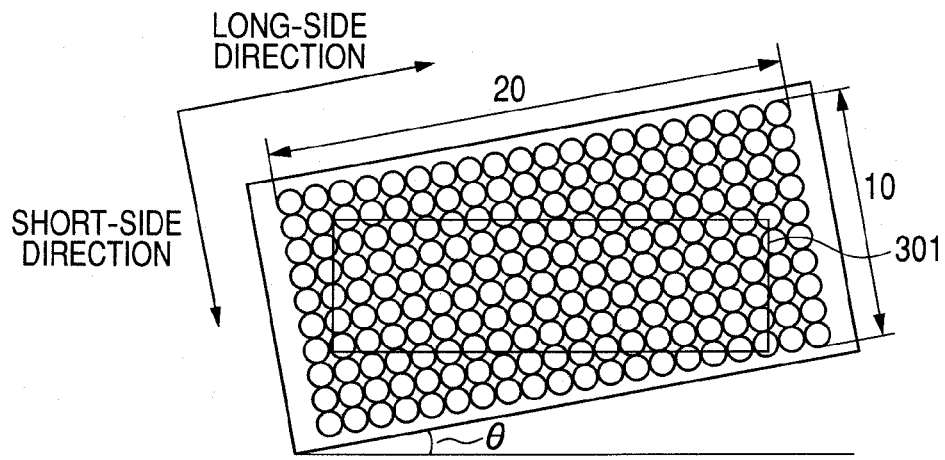
(a)
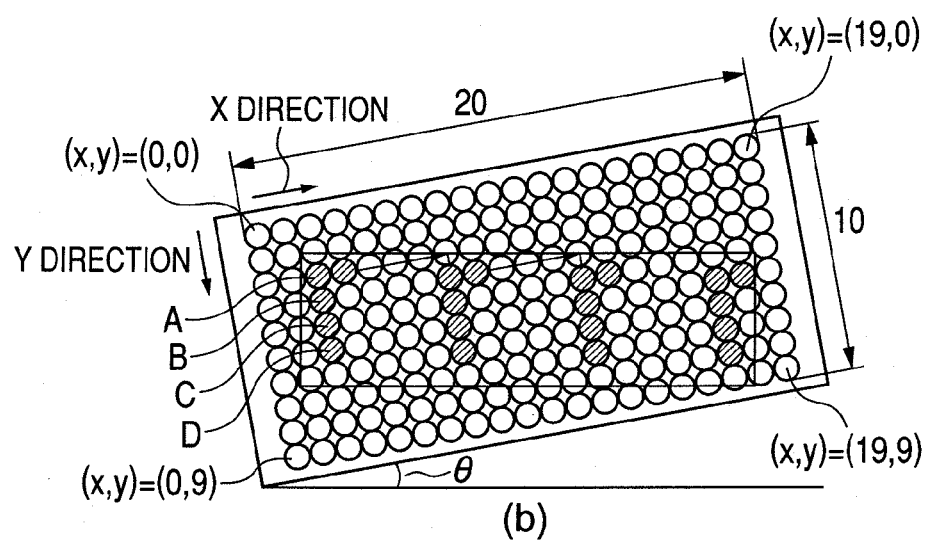
(b)
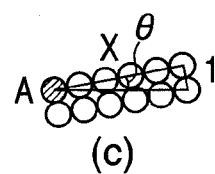
(c)
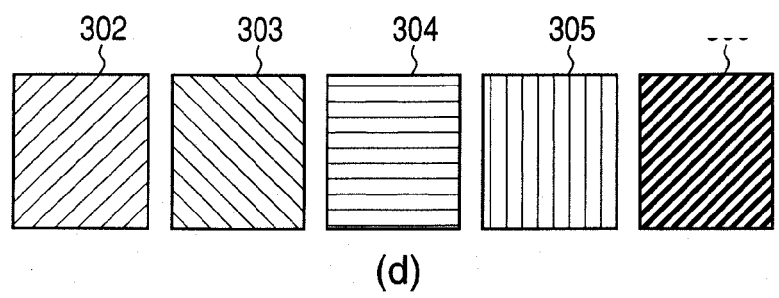
(d)

FIG. 7
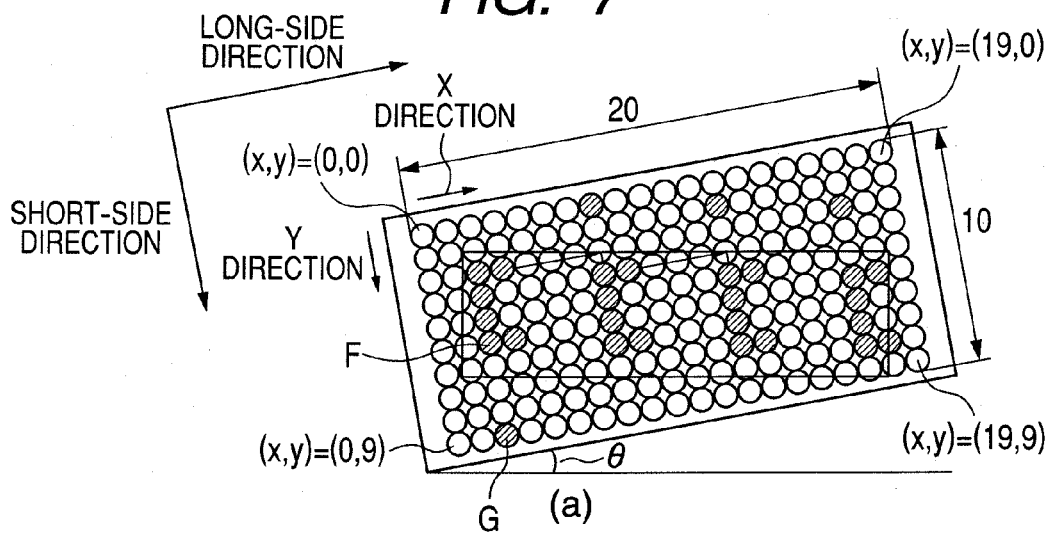
(a)
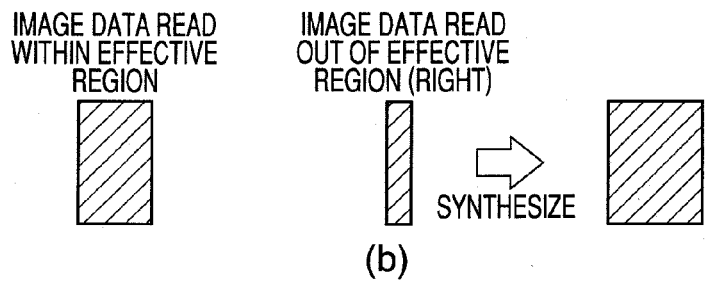
(b)
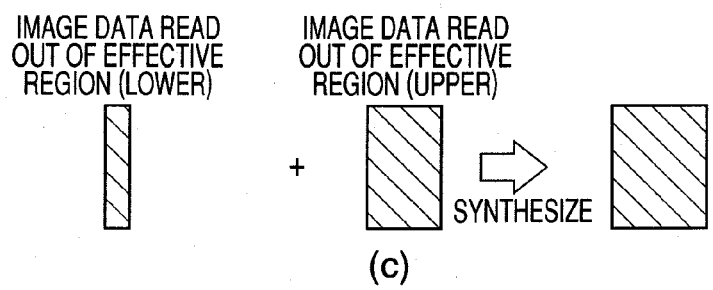
(c)
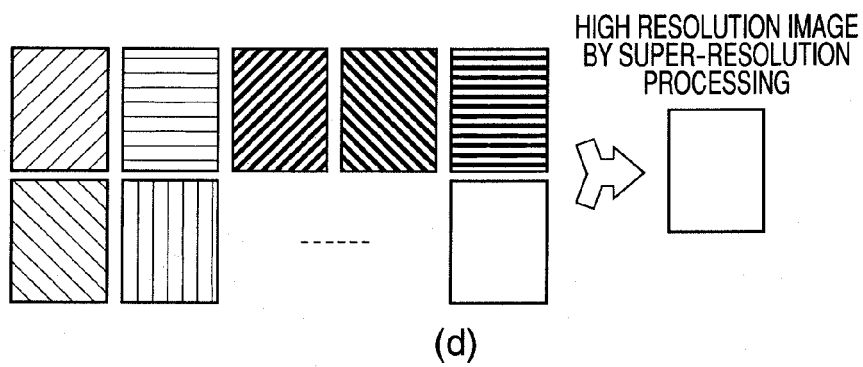
(d)

FIG. 8
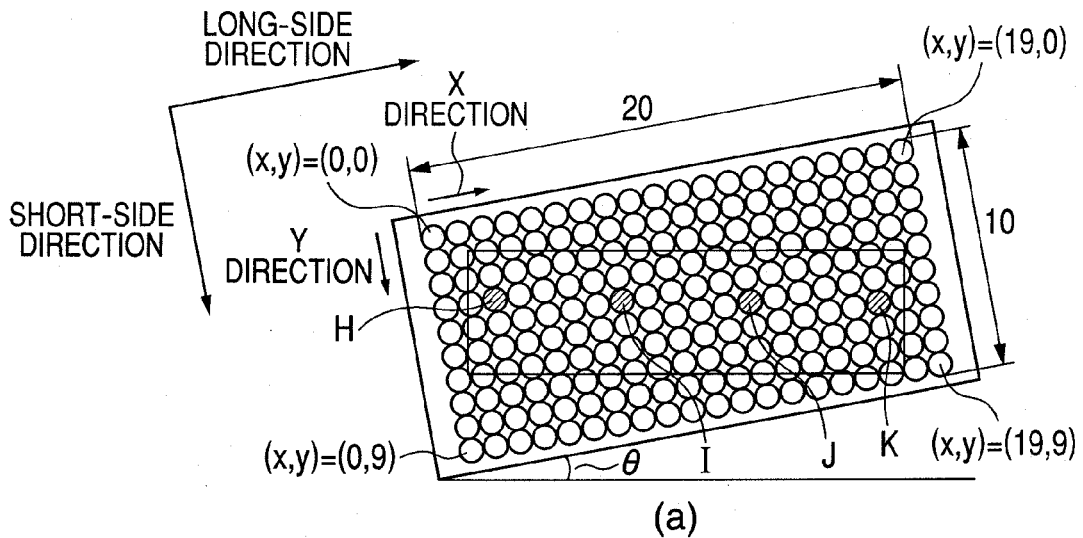
(a)
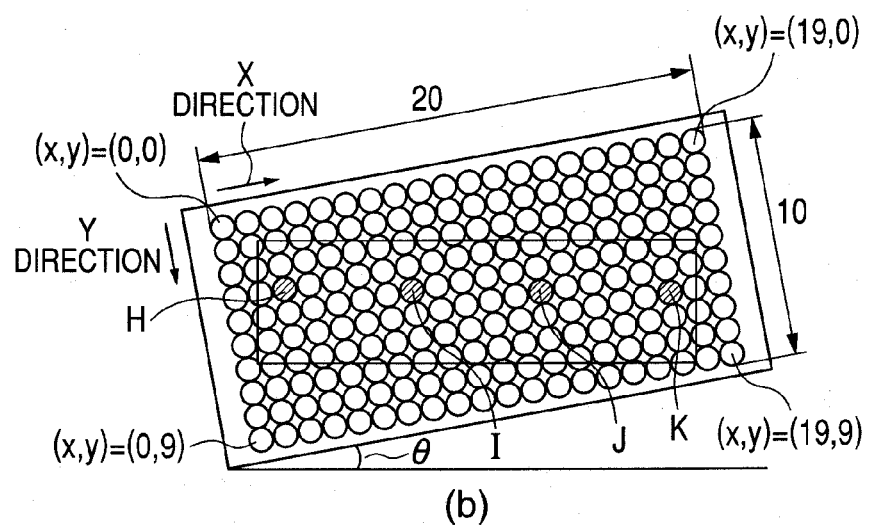
(b)

FIG. 10
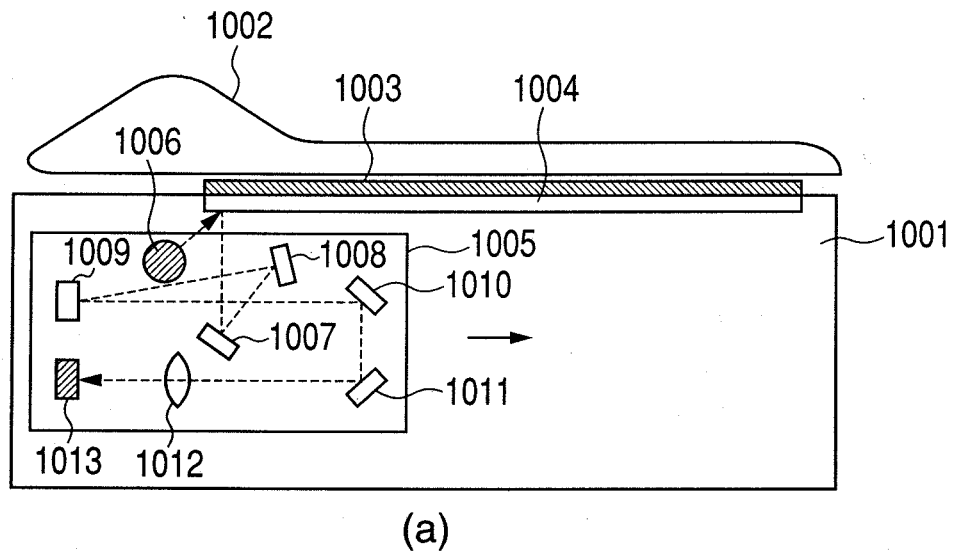
(a)
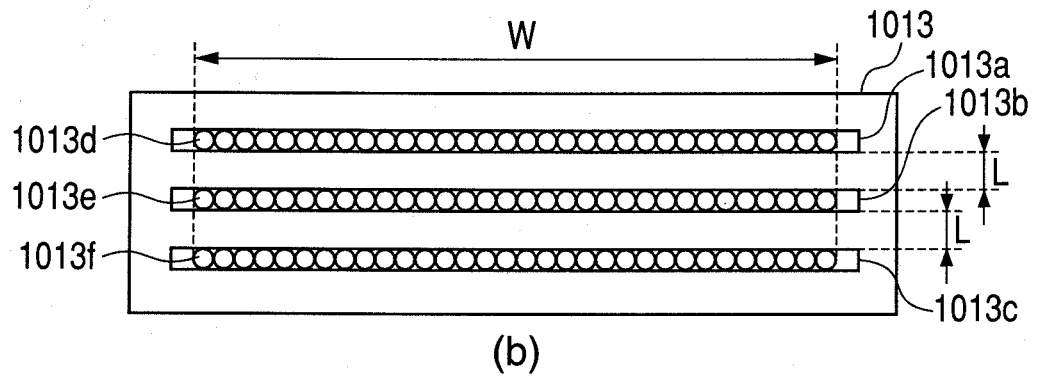
(b)
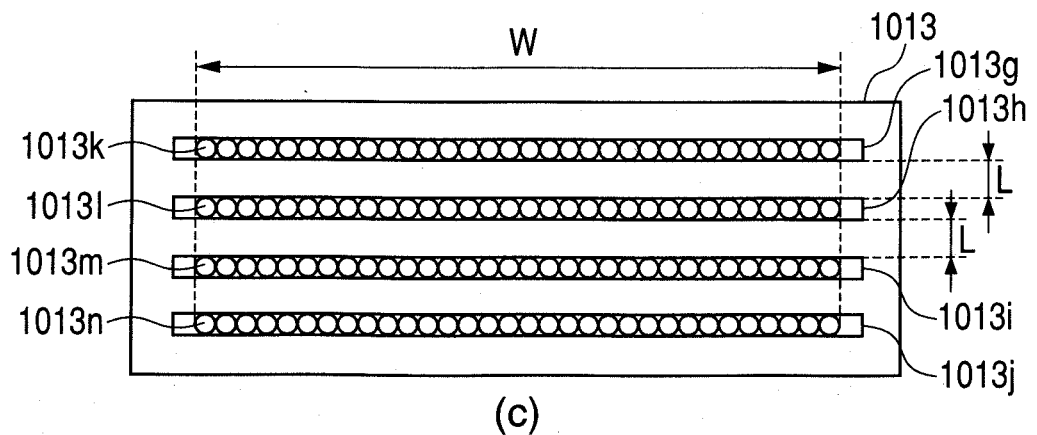
(c)

FIG. 11
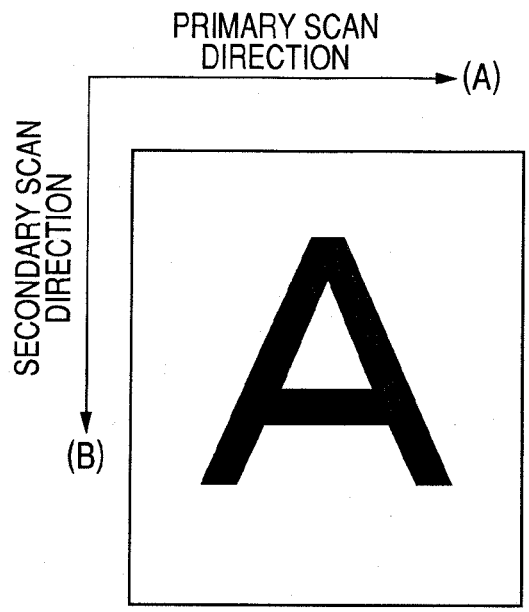
(a)
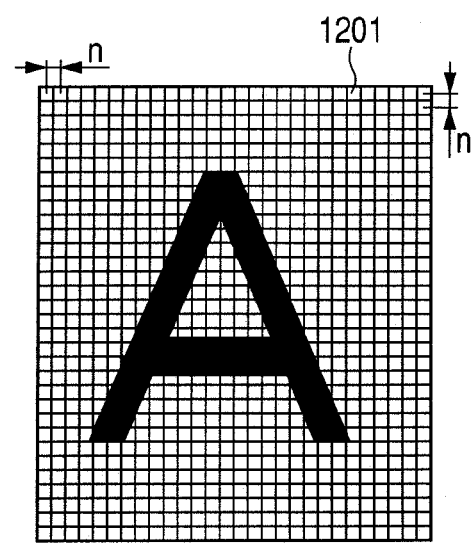
(b)
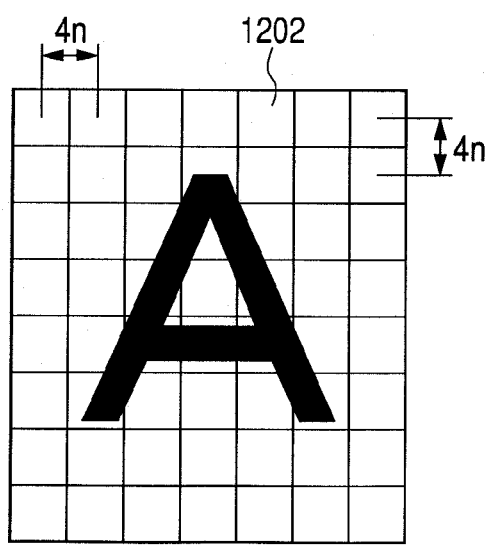
(c)

FIG. 12
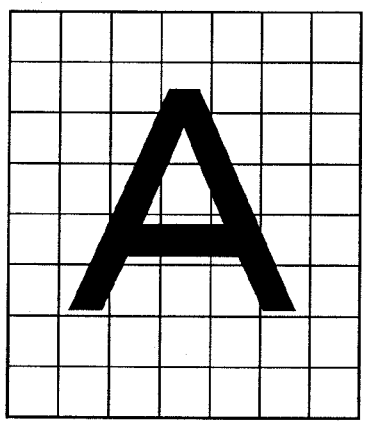
(a)
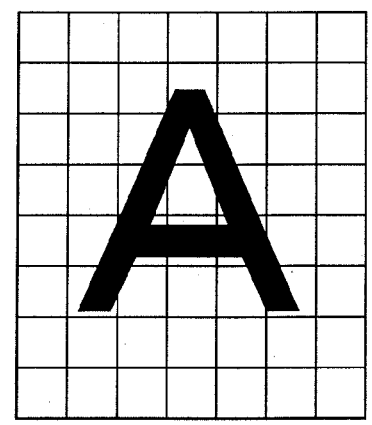
(b)
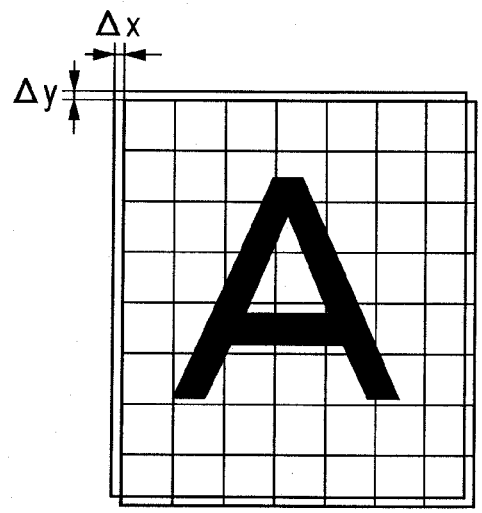
(c)
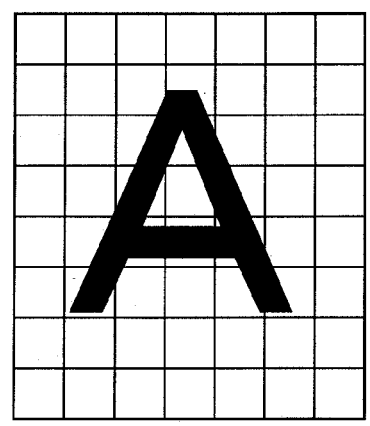
(d)
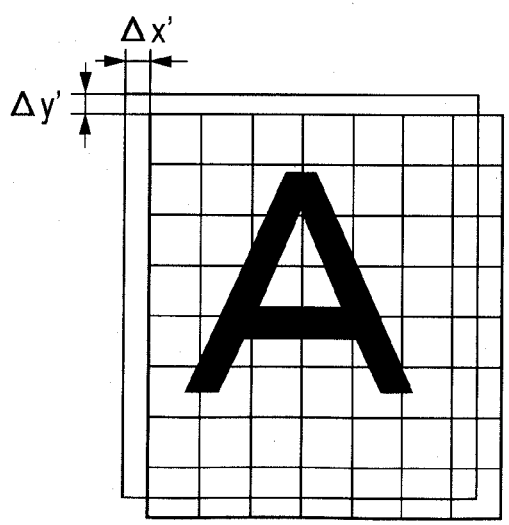
(e)
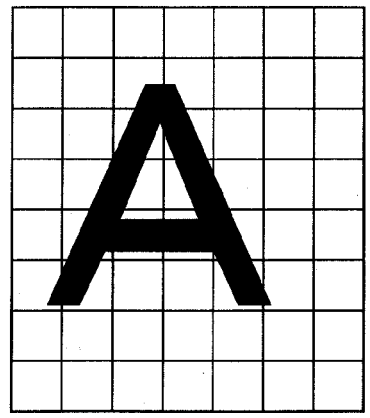
(f)

FIG. 13
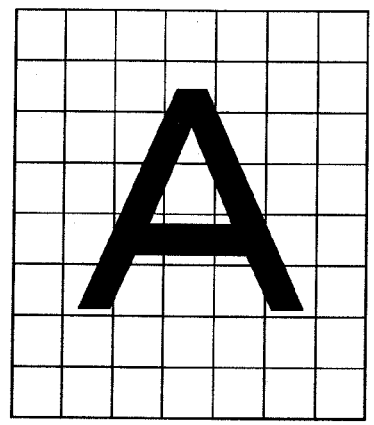
(a)
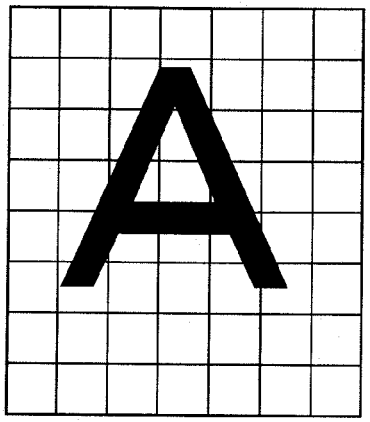
(b)
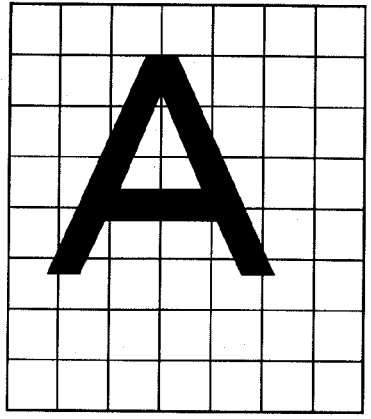
(c)
⋮
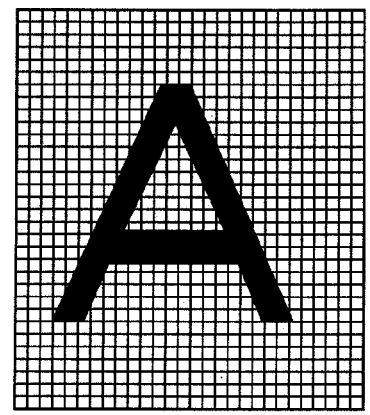
(d)

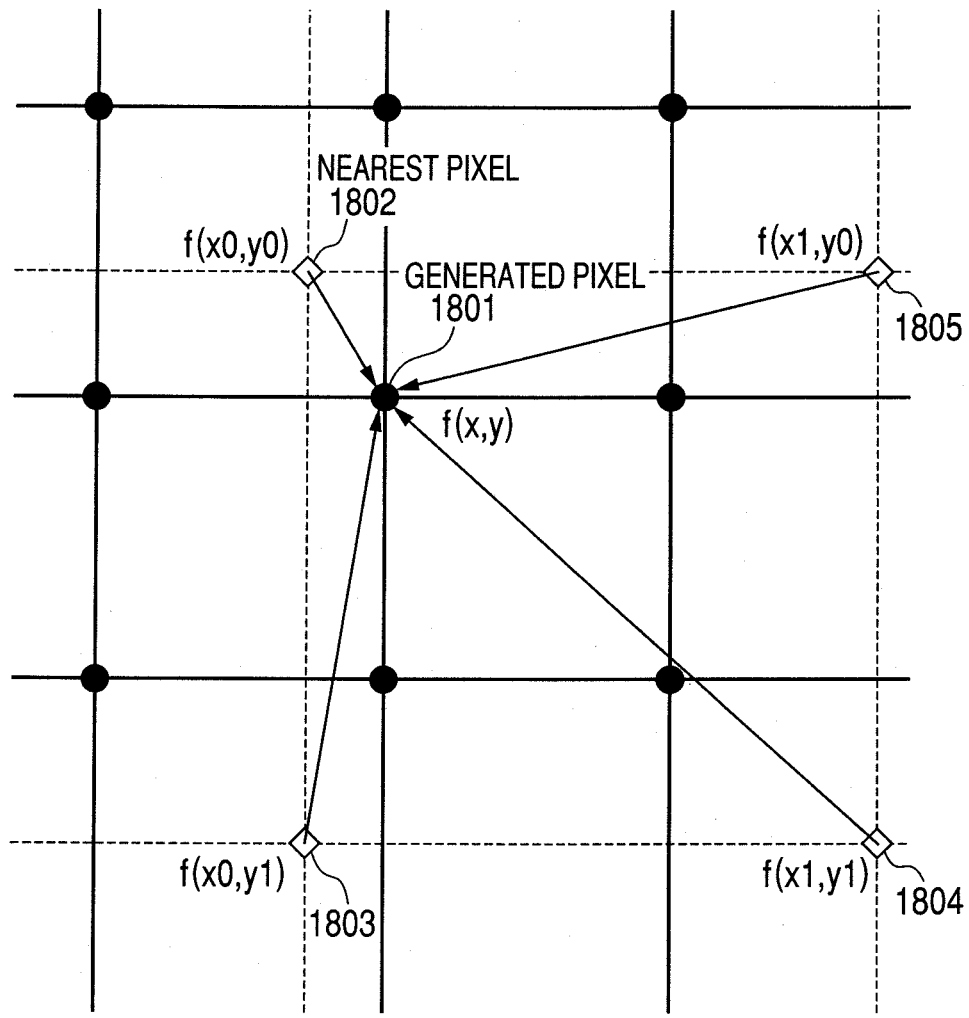

IMAGE PROCESSING APPARATUS AND IMAGE PROCESSING METHOD

CROSS REFERENCE TO RELATED APPLICATIONS

This application is a National Stage filing of PCT Application No. PCT/JP2008/073887 filed on Dec. 19, 2008, which claims priority from Japanese Patent Application No. 2007-330975 filed Dec. 21, 2007, and Japanese Patent Application No. 2008-317280 filed Dec. 12, 2008, all of which are hereby incorporated by reference herein in their entirety.

TECHNICAL FIELD

The present invention relates to an image processing apparatus and an image processing method which read image data.

BACKGROUND ART

In recent years, networking of offices, as well as digitalization and colorization of handled documents have advanced.

The digitalization has facilitated document processing and transfer, and streamlining of business has been attempted.

Moreover, beautiful looking and effective documents have been generated through the colorization.

While such digitalization and colorization of the documents have advanced, effective capture and output performance for generated image data is required in a multifunction peripheral which is an image processing apparatus.

A configuration of a reader in the multifunction peripheral which inputs the image data is an element which is most related to capture of original document image data or image quality of output images at the time of a copy operation.

As the configuration of the reader in the multifunction peripheral, there are a reduction optical system and a contact optical system.

Reading resolutions of these optical systems depend on sensor components for a pixel arranged in a primary scan direction.

As a process of improving the resolution without depending on the number of these sensor components for a pixel arranged in the primary scan direction, there is a technique referred to as "super-resolution processing".

Although this technique will be described later, the super-resolution processing uses a plurality of frames of the image data read at the resolution of the sensor included in the reader. Therefore, a resolution of the output image is dramatically improved.

Usage of the super-resolution processing technique enables, for example, generation of image data with a resolution of 1200 dpi by using a plurality of pieces of image data read at a resolution of 300 dpi.

International Publication No. WO 2004/068862 describes details of processing contents of the super-resolution processing in which high resolution image data which cannot be obtained by the reader is generated from the plurality of pieces of the image data.

Moreover, Japanese Patent Application Laid-open No. 2006-092450 describes realization of high resolution processing by controlling the number of images which are sources of a synthesized image depending on an image size.

This control is performed so that the number of frames to be synthesized is increased for a smaller image size.

However, in order to perform the above described super-resolution processing, first, a plurality of frames of the image data is required in which an original document image reading position has been shifted by a very small amount, with one frame image read at the resolution of the sensor included in the reader, as a reference.

In other words, a plurality of continuous frames of the image data is required in which a position of an original document read by the sensor has been shifted from reference image data, little by little in the primary scan direction and/or a secondary scan direction.

Moreover, when this plurality of pieces of the image data is read, the shift in the original document image reading position exists among the image data obtained by adjacent sensors. This shift is required to be less than one pixel (sub-pixel) in the primary scan direction and/or the secondary scan direction.

The higher the resolution of the image data to be generated by the super-resolution processing is, the larger the number of necessary frames of the image data read at the resolution of the sensor included in this apparatus is.

If the super-resolution processing can be performed in the multifunction peripheral, a high resolution image which would be realized with a high resolution reading device can be obtained with a low resolution reading device, which, however, requires satisfaction of conditions as described above.

However, line sensors are generally used in the reader in the multifunction peripheral, such as a scanner in the multifunction peripheral.

In other words, the number of read frames which can be obtained in one reading operation is one frame.

Moreover, the above described reader reads an original document image by using a group of the sensor components for a pixel which are arranged horizontally in the primary scan direction at a distance of an integral multiple of a pixel.

Consequently, there is a problem in that a position of the pixel to be read cannot be shifted by a very small amount (sub-pixel) in the primary scan direction to read the original document image.

DISCLOSURE OF THE INVENTION

The present invention is for solving the problems, and is, as a unit which solves the problems:

an image processing apparatus in which an area sensor formed by arranging sensor components for a pixel in a two-dimensional array is attached in an inclined manner with respect to a reference installation position, characterized by including:

a sensor unit which reads, from the sensor components for a pixel which are determined based on an inclination angle indicating an inclination of the area sensor from the reference installation position and have been arranged within the area sensor, image data in which the inclination has been corrected;

an image obtaining unit which obtains a plurality of frames of image data having a shift of less than one pixel, by scanning an original document image once by the sensor unit; and a high resolution conversion unit which obtains image data with a resolution higher than resolutions of the sensor components for a pixel by using the plurality of pieces of the image data obtained by the image obtaining unit to perform interpolation processing.

According to the present invention, an image processing apparatus and a method thereof can be provided in which the area sensor is used as an image pickup device and a plurality of pieces of low resolution image data is simultaneously read in one reading operation.

Thereby, super-resolution processing can be performed in the image processing apparatus, and moreover, non-inclined image data can also be provided before the super-resolution processing.

Further features of the present invention will become apparent from the following description of exemplary embodiments with reference to the attached drawings.

BRIEF DESCRIPTION OF THE DRAWINGS

FIG. 2 is a diagram illustrating an effective reading region within an area sensor in the present invention.

FIG. 3 is a diagram describing selection of sensor components for a pixel and definition of reading line sensors in a first embodiment of the present invention.

FIG. 7 is a diagram describing pixel sensor coupling in a second embodiment of the present invention.

FIG. 8 is a diagram describing pixel sensor thinning in the second embodiment of the present invention.

FIG. 10 is a configuration diagram of a reduction optical system in a conventional multifunction peripheral.

FIG. 11 is a conceptual diagram in the case where super-resolution processing has been applied to a still image.

FIG. 12 is a conceptual diagram in the case where the super-resolution processing has been applied to the still image.

FIG. 13 is a conceptual diagram in the case where the super-resolution processing has been applied to the still image.

FIG. 27 is a diagram describing the details of the super-resolution processing.

BEST MODES FOR CARRYING OUT THE INVENTION

Description of Common Reader

Figure 1:
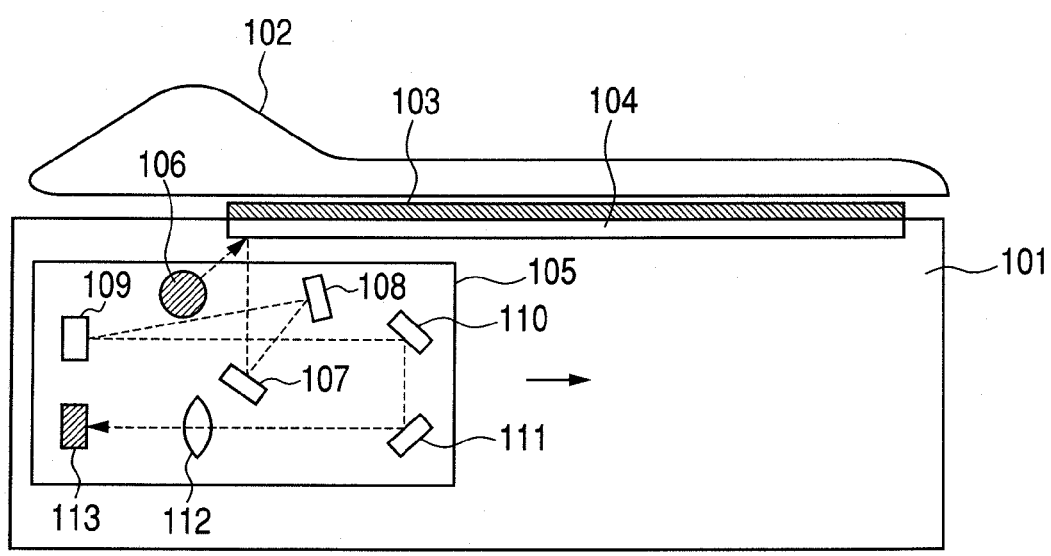
FIG. 1 is a diagram illustrating a configuration of a reader in the present invention.

First, an example of a reduction optical system will be described as a configuration of a common image reader.

Generally, in a high-performance multifunction peripheral, a configuration of the reduction optical system may be often used for maintaining performance such as a reading speed, a reading resolution, and image quality of read image data.

Moreover, a device used for a reader in the reduction optical system may often be a CCD (Charge Coupled Device).

(a) of FIG. 10 illustrates a configuration of the reader in the reduction optical system.

In the same figure, the reader comprises a main body 1001 and an ADF unit (Auto Document Feeder) 1002 which functions to hold an original document and feed the original document to an original document reading position when flow reading is performed.

The reader further comprises a glass plate 1004 on which an original document 1003 is placed for reading of an original document image on the document. The reader still further comprises a unit 1005 which includes a reading device for reading the original document image 1003 and a device for picking up the original document image.

A white light source such as a xenon tube is usually used as a light source 1006.

Mirrors 1007 to 1011 have a role of transmitting a reflected light from a light emitted to an original document by the light source 1006, to an image pickup device.

A lens 1012 collects the reflected light from the original document image, which has been reflected by the mirror 1011, into an image pickup device width.

An image pickup device 1013 includes the CCD in the reduction optical system.

Next, a process of reading the original document image in the reduction optical system will be described.

The light emitted to the original document image data 1003 by the light source 1006 is reflected by the original document image placed on the glass plate 1004, and received by the mirror 1007.

An intensity of the light reflected by the mirror 1007 depends on the original document image. The higher a luminance of the original document image is, the stronger the light intensity is.

In other words, original document image having a white color with a high reflectance provides the highest light intensity.

The light received by the mirror 1007 is sequentially reflected by the mirror 1008, the mirror 1009, the mirror 1010, and the mirror 1011, and output to the lens 1012.

The lens 1012 collects and outputs the light reflected by the mirror 1011 to adjust the light for the width of the image pickup device 1013.

In this way, the reduction optical system is characterized by the configuration in which the reflected light from the original document image is reflected by a plurality of mirrors, finally collected by the lens, and input to the image pickup device.

In the reader in the reduction optical system, the light is reflected by the plurality of mirrors because an optical path is required for adjusting the light for the width of the CCD.

For example, it is known that the optical path required for imaging optical data of the original document image onto the CCD with a width of 50 mm needs at least approximately 200 mm.

In this way, the reduction optical system requires an optical path length according to a size of the image pickup device, but has very high reading characteristics.

Specifically, even if the original document image 1003 does not completely and closely contact the glass plate 1004, the original document image in focus can be read.

A distance required for this focusing is referred to as "depth of field".

With a larger numerical value thereof, even when the original document image 1003 does not completely and closely contact the glass plate 1004, the original document image is read without problems, to some extent.

Next, an example of a configuration of the image pickup device 1013, that is, the CCD device is illustrated in (b) and (c) of FIG. 10.

(b) of FIG. 10 is an example of a 3-line sensor, and illustrates a horizontal direction as a primary scan direction and a vertical direction as a secondary scan direction.

In the same figure, line sensors 1013*a*, 1013*b* and 1013*c* read three color signals configuring a color image, and can read line data including H pixels in the primary scan direction.

Sensor components for a pixel 1013*d*, 1013*e* and 1013*f* are included in the line sensors which read the respective color signals.

The sensor components for a pixel 1013*d*, 1013*e* and 1013*f* are configured to be continuously arranged in the horizontal direction for the respective color signals to be read.

A reading resolution of the CCD device depends on the number of the sensor components for a pixel arranged for the respective color signals.

In other words, a larger number of the H pixels enable the image data to be read at a higher resolution.

For example, in the case of the CCD with a reading resolution of 600 dpi, a distance among the sensor components for a pixel is a distance based on the resolution of 600 dpi.

The reading resolution, that is, the number of the sensor components for a pixel directly affects a unit price of the CCD.

In other words, in order to realize the image data reading at the high resolution, the reader must be configured by using the CCD with a large number of the sensor components for a pixel even if the unit price increases.

Next, the CCD device is characterized in that there is a distance among the line sensors which read the respective color signals.

For example, the line sensor 1013*a* is assumed to be a sensor including a filter which reads red (hereinafter referred to as "R") image data.

The line sensor 1013*b* is assumed to be a sensor including a filter which reads green (hereinafter referred to as "G") image data.

In this case, there is a physical distance between the line sensor 1013*a* and the line sensor 1013*b*, in terms of implementation of the sensors, as the image pickup device.

If this distance is L (pixels), a shift of L pixels in the secondary scan direction is caused in the R image data and the G image data which have been read at the same timing.

Similarly, if the line sensor 1013*c* includes a filter which reads blue (hereinafter referred to as "B") image data, the shift of L (pixels) is caused in the G image data and the B image data which have been read at the same timing.

A shift of 2L (pixels) is caused in the R image data and the B image data.

The distance L among the line sensors which read the respective color signals affects a configuration of an image processor for the image data read by the reader.

In common image processing, the processing is not performed in units of the line sensors which read the respective color signals such as R, G and B, but in units of pixels.

Moreover, there is a problem in that, when a reading device unit 1005 is operated, a mechanical shift is caused and the distance L among the respective line sensors cannot be constant. This shift appears as a color shift in image formation for the read image data, and directly leads to degradation in an output image.

Therefore, a line interval L in the CCD applied in the high-performance multifunction peripheral is very small, which is approximately two lines (pixels).

Next, a CCD with a configuration of a 4-line sensor will be described.

(c) of FIG. 10 is a diagram illustrating the configuration of the 4-line sensor. This figure also illustrates the horizontal direction as the primary scan direction and the vertical direction as the secondary scan direction.

In the same figure, line sensors 1013*g*, 1013*h* and 1013*i* read the three color signals configuring the color image, and can read the line data including the H pixels in the primary scan direction.

Sensor components for a pixel 1013*k*, 1013*l* and 1013*m* are included in the line sensors which read the respective color signals, and configured to be continuously arranged in the horizontal direction for the respective color signals to be read.

A line sensor 1013*j* reads monochrome image data, and can read the line data including the H pixels in the primary scan direction, similarly to the line sensors which read the color image. Sensor components for a pixel 1013*n* are for reading the monochrome image, and configured to be continuously arranged in the horizontal direction.

In comparison with the 3-line sensor, the 4-line sensor is different in that different sensors are used for the reading between when the color image is read and when the monochrome image is read. However, the 4-line sensor basically operates similarly to the 3-line sensor.

For example, the line sensor 1013*g* is assumed to be the sensor including the filter which reads the R image data.

Similarly, the line sensor 1013*h* is assumed to be the sensor including the filter which reads the G image data, and the line sensor 1013*i* is assumed to be the sensor including the filter which reads the B image data.

In this case, when the color image is read, the line sensor 1013*g*, the line sensor 1013*h* and the line sensor 1013*i* are used to read the original document image.

Since the line interval L exists among the respective line sensors, after the image is read, the image processor requires a memory for correcting the line interval and providing the image data in units of pixels.

When a monochrome original document is read, the line sensor 1013*j* which is not used for reading the color image data is used to read the original document image.

In this case, since there is no dependency with other line sensors, the line interval is not corrected, and the read image data is directly handled in the image processor after the image is read.

It should be noted that, similarly to the 3-line sensor, also in the 4-line sensor, the reading resolution of the CCD device depends on the number of the sensor components for a pixel arranged for the respective color signals.

In other words, the larger number of the H pixels enable the image data to be read at the higher resolution.

Moreover, also similarly, the reading resolution, that is, the number of the sensor components for a pixel directly affects the unit price of the CCD. In order to realize the image data reading at the high resolution, the reader must be configured by using the CCD with the large number of the sensor components for a pixel even if the unit price increases.

In this way, the configuration of the reader in the common multifunction peripheral employs the configuration of any of the above described reduction optical system and a contact optical system.

Consequently, it is common to these systems that the reading resolution is determined depending on the number of the sensor components for a pixel arranged in the primary scan direction.

On the other hand, there is a technique referred to as "super-resolution processing".

The super-resolution technique uses a plurality of pieces of image data read at the resolution of the sensor in the reader to dramatically improve an original resolution of the image data.

(Regarding Super-Resolution Processing)

Next, the super-resolution processing technique will be described.

(a) of FIG. 11 is assumed to be the image data to be read by the reader.

A pixel configuration in the case where this image data has been read, for example, at a resolution of 1200 dpi is illustrated in (b) of FIG. 11.

In (b) of FIG. 11, a lattice 1201 is assumed to illustrate pixel data configured at the reading resolution.

In other words, a distance n among the pixels corresponds to a distance among adjacent sensor components for a pixel in the case of the reading at the resolution of 1200 dpi. (c) of FIG. 11 illustrates a pixel configuration in the case where the reader has read an image with the same image size at a resolution of 300 dpi.

Similarly to (b) of FIG. 11, a lattice 1202 is assumed to illustrate the pixel data configured at the reading resolution.

Therefore, with the distance n among the pixels at the resolution of 1200 dpi as a reference, in the case where the reading has been performed at the resolution of 300 dpi, the distance among the pixels becomes coarse, which is 4n.

Since reproducibility of the read image is proportional to the resolution, if the image data read at the resolution of 1200 dpi ((b) of FIG. 11) is directly compared with the image data read at the resolution of 300 dpi ((c) of FIG. 11), a difference in image quality is evident.

The super-resolution processing is a technique of generating the image data of (b) of FIG. 11 from a plurality of pieces of the image data corresponding to this (c) of FIG. 11.

Usage of this technique enables to configure a read image equivalent to the read image configured by a high resolution device, even if an original resolution of the reading device is not so high.

However, it is necessary to satisfy some conditions in order to perform "super-resolution conversion" processing for obtaining one of high resolution image data and further high resolution image data from low resolution image data.

First, a plurality of frames of the image data of the original document image is required in which a reading position has been shifted by a very small amount in the primary scan direction and/or the secondary scan direction, with the image data of the original document image read at the sensor resolution in the reader, as a reference.

In other words, a plurality of continuous frames of the image data is required in which a position of the original document read by the sensor has been shifted from the reference image data, little by little in the primary scan direction and/or the secondary scan direction.

Moreover, when this plurality of frames of the image data is read, a shift in an original document image reading position exists among frame image data obtained by adjacent sensors. This shift is required to be less than one pixel (sub-pixel) in the primary scan direction and/or the secondary scan direction.

This shift in the reading position may be a shift of less than one pixel, which remains as a result of offset correction of a positional shift of an integral multiple.

Hereinafter, data which has been read when an original document image including one screen (frame) has been scanned, and which configures this one screen (frame) of the original document image, is referred to as "frame image data".

Moreover, the position to be read in the original document image is referred to as "phase".

Moreover, this phase being shifted is referred to as "phase is shifted", and a shift in the reading position is referred to as "phase shift".

Moreover, the low resolution used herein is not limited to 300 dpi, and represents a resolution of an image output by an apparatus through usual printing.

Moreover, the "primary scan direction" referred to herein is a vertical direction with respect to a direction in which, when the original document image placed on the original document table is read by the scanner, the unit 1005 moves with respect to the original document image. In (a) of FIG. 11, the primary scan direction is illustrated with an arrow (A), which is a lateral direction of the read original document.

Similarly, the "secondary scan direction" is a horizontal direction with respect to the direction in which the unit 1005 moves. In (a) of FIG. 11, the secondary scan direction is illustrated with an arrow (B).

Of course, the original document image with the phase shift only in the primary scan direction, or the original document image with the phase shift only in the secondary scan direction can also be changed to the high resolution.

However, in this case, the change to the high resolution is attempted only in the direction with the phase shift.

The conditions required for the super-resolution processing will be described by using (a) of FIG. 12 and subsequent drawings.

(a) of FIG. 12 is a diagram illustrating a pixel configuration when the original document image data of (a) of FIG. 11 has been read at the resolution of 300 dpi.

This figure is the same as the original document image (a) of FIG. 11.

This read image data (b) of FIG. 12 becomes a first frame of target image data to be applied with the super-resolution processing, which becomes the reference image data.

Next, as illustrated in (c) of FIG. 12, the original document image data of (a) of FIG. 12 is read at the resolution of 300 dpi, while the phase is shifted by $\Delta x$ $(\Delta x < 4n)$ in the primary scan direction and by $\Delta y$ $(\Delta y < 4n)$ in the secondary scan direction in the reference image data.

In this case, the phase in (d) of FIG. 12 which is the read image data is different from the original document image data, and has been shifted by $\Delta x$ in a leftward primary scan direction and by $\Delta y$ in an upward secondary scan direction, as illustrated in the figure.

(d) of FIG. 12 which is this read image data becomes a second frame of the target image data to be applied with the super-resolution processing.

Furthermore, as illustrated in (e) of FIG. 12, the original document image data of (a) of FIG. 12 is read at the resolution of 300 dpi, while the phase is shifted by Δx' (Δx'<4n, Δx<Δx') in the primary scan direction and by Δy' (Δy'<4n, Δy<Δy') in the secondary scan direction in the reference image data.

In this case, the phase in (f) of FIG. 12 which is the read image data is different from the original document image data, and has been shifted by Δx' in the leftward primary scan direction and by Δy' in the upward secondary scan direction, as illustrated in the figure.

(f) of FIG. 12 which is this read image data becomes a third frame of the target image to be applied with the super-resolution processing.

In this way, once the read data of the plurality of frames of the low resolution image data having different phase shifts respectively with respect to the reference image data is obtained, the change to the high resolution is enabled by the super-resolution processing.

FIG. 13 illustrates a concept of configuring the high resolution image data from three pieces of the low resolution image data.

This figure illustrate that image data of (d) of FIG. 13 is obtained if the super-resolution processing is used for (a) of FIG. 13 which is the reference image data, and (b), (c) . . . of FIG. 13, which are the plurality of frames of the low resolution image data having the different phase shifts respectively.

The super-resolution processing performed at this point will be described in further detail by using FIGS. 26 and 27.

Figure 26:
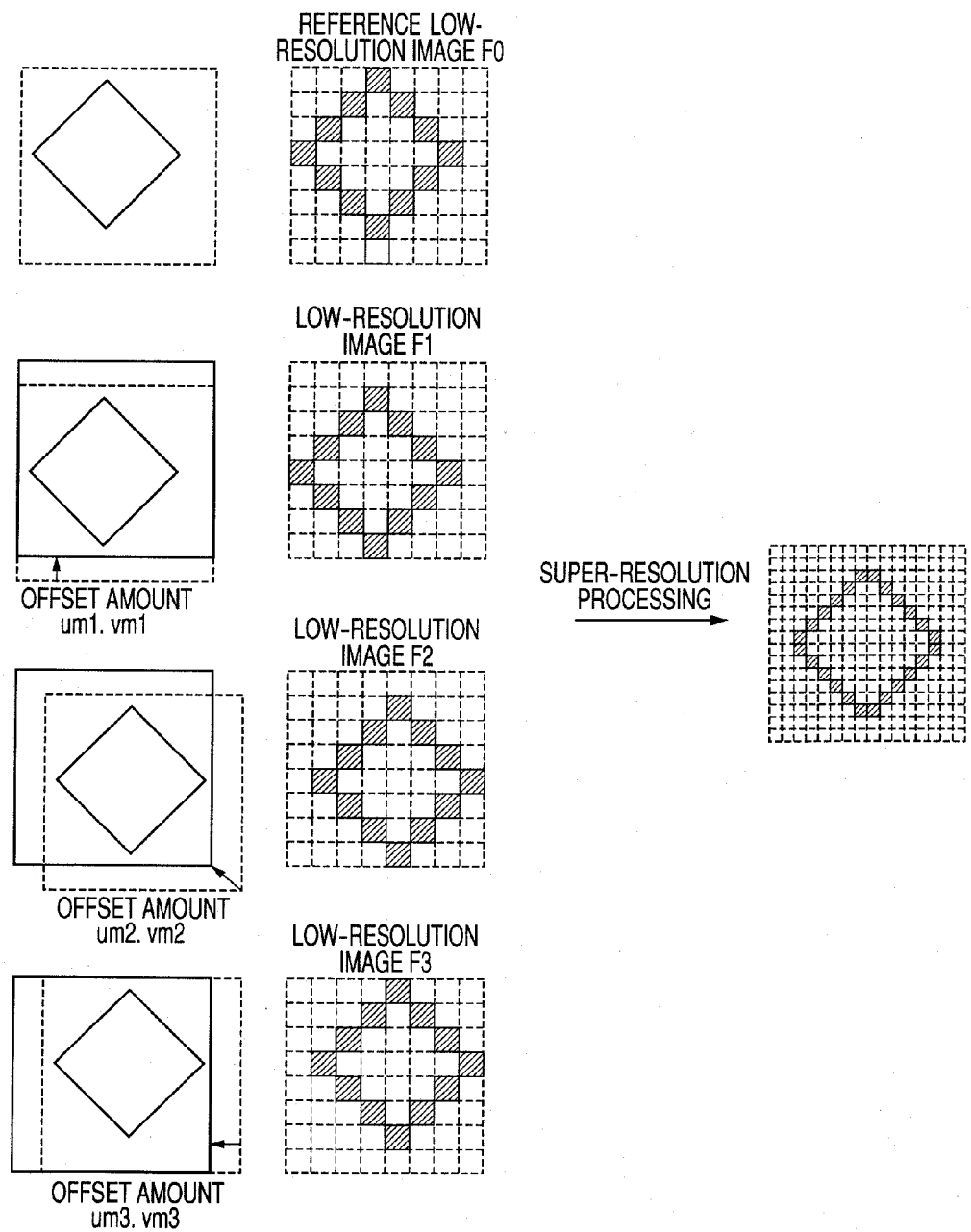
FIG. 26 is a diagram describing details of the super-resolution processing.

FIG. 26 is a diagram illustrating the low resolution image data used for the super-resolution processing and the image data after the super-resolution processing. FIG. 26 illustrates reference low resolution image data F0 and target low resolution image data F1 to F3, which have been obtained by reading the original document image and the original document by an area sensor. A dotted rectangle surrounding the original document image illustrates a region when the reference low resolution image data F0 has been read by the area sensor, and a solid rectangle illustrates a region when each of the target low resolution image data F1 to F3 has been read by the area sensor.

In the present embodiment, an offset amount in the primary scan direction is represented as "um", and an offset amount in the secondary scan direction is represented as "vm", respectively. Moreover, for the target low resolution image data Fn (n=1 to 3), offset amounts thereof are represented as "umn" and "vmn". For example, as illustrated in FIG. 26, in the target low resolution image data F1, a shift is caused in the secondary scan direction with respect to the reference low resolution image data F0, and the offset amounts thereof are represented as um1 and vm1.

Similarly, also for the target low resolution images F2 and F3, the offset amounts are represented as um2 and vm2, as well as um3 and vm3.

The offset amounts for each of the target low resolution image data Fn (n=1 to 3), umn and vmn, are calculated based on the image data of the reference low resolution image data F0 and the image data of the target low resolution image data F1 to F3. A predetermined calculation according to inclination information on the area sensor which has been previously stored in a ROM 203 is used for the calculation.

This FIG. 26 schematically illustrates the shift in each of the target low resolution image data as being in units of one pixel.

However, in the reading by the area sensor in this embodiment, a phase shift of less than one pixel has been caused with respect to the primary scan direction and the secondary scan direction. This very small shift is used to enable the image to be changed to the high resolution as described above.

Therefore, among respective pixels configuring super-resolution-processed image data to be generated (hereinafter referred to as "generated pixels"), there is a pixel which does not exist in any of the reference low resolution image data and the target low resolution image data.

Such a pixel is changed to the high resolution while being synthesized, by using pixel data representing pixel values of pixels existing at the periphery of the generated pixel to perform predetermined interpolation processing. As the interpolation processing, the interpolation processing such as a bilinear method, a bicubic method, and a nearest neighbor method can be used.

For example, the case of using the interpolation processing according to the bilinear method will be described by using FIG. 27. First, from the reference low resolution image data and the target low resolution image data, a nearest pixel 1802 at a distance nearest to a position (x, y) of a generated pixel 1801 is extracted.

Then, from the target low resolution image data of FIG. 27, four pixels surrounding the generated pixel position are determined as peripheral pixels 1802 to 1805.

Then, values obtained by adding predetermined weights to data values of the peripheral pixels are averaged, and a data value of the generated pixel is obtained by the following formula:

$$f(x,y)=[|x1-x|\{|y1-y|f(x0,y0)+|y-y0|f(x0,y1)\}+|x-x0|\{|y1-y|f(x,y0)+|y-y0|f(x1,y1)\}]/|x1-x0||y1-y0|$$

For example, a super-resolution image with a double resolution as illustrated in FIG. 26 can be obtained by repeating the above described processing for each generated pixel position. It should be noted that the resolution is not limited to the double resolution, but can be various magnifications. Moreover, if a plurality of data values of the low resolution image data is used for the interpolation processing, a higher-definition, super-resolution image can be obtained.

First Embodiment

Hereinafter, a first embodiment will be described in detail with reference to the drawings.

FIG. 1 is a diagram illustrating an example of a reader in a multifunction peripheral applied with this embodiment.

As shown in the figure, the reader comprises a main body 101 and an ADF unit 102 which holds an original document and feeds the original document to the original document reading position when the flow reading is performed.

The reader further comprises a glass plate 104 on which an original document 103 is placed for reading of an original document image on the document.

The reader still further comprises a unit 105 which includes a reading device for reading the original document image 103 and a device for picking up the original document image.

The white light source such as the xenon tube is used as a light source 106.

Mirrors 107 to 111 have a role of transmitting a reflected light from a light emitted to the original document image by the light source 106, to the image pickup device.

A lens 112 collects the reflected light from the original document image, which has been reflected by the mirror 111, into the image pickup device width.

An image pickup device 113 includes the area sensor in this embodiment.

The area sensor is an image pickup device applied to a digital camera or the like, in which sensor components for a pixel which read the original document image data are arranged in a two-dimensional array, which is different from the above described sensor in units of lines.

Figure 14:
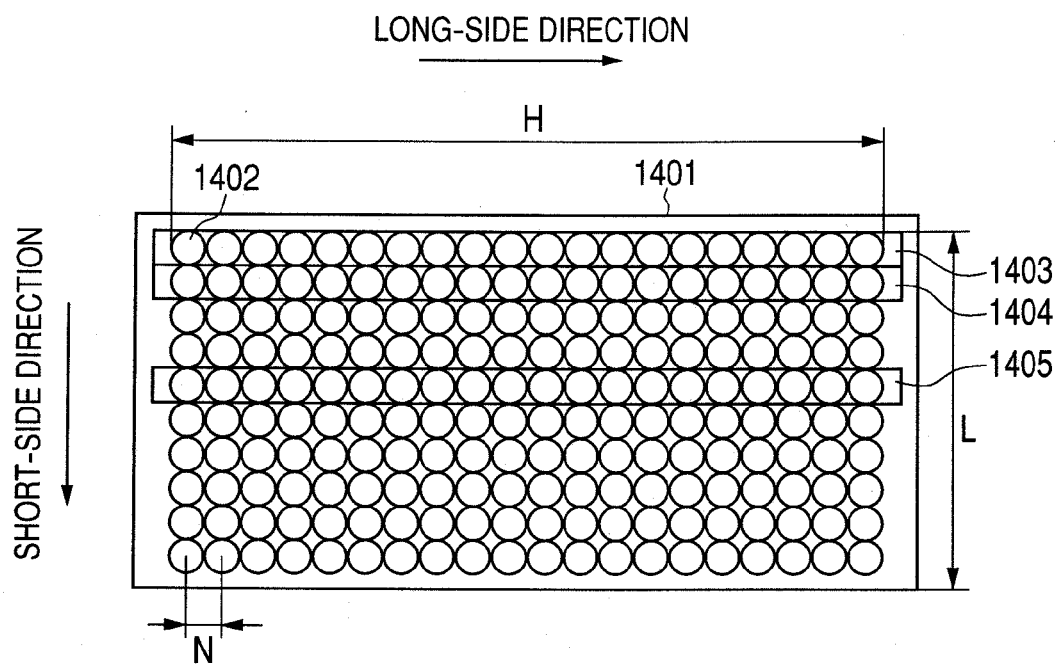
FIG. 14 is a diagram illustrating a configuration of the area sensor.

FIG. 14 is a diagram illustrating a configuration of the area sensor. This figure illustrates an area sensor device 1401.

This one pixel may be a color-enabled pixel sensor including RGB by equally dividing this pixel sensor of one pixel into four.

There are sensor components for a pixel 1402 in the area sensor 1401. Sensor components for a pixel of H pixels in a long-side direction and L pixels in a short-side direction are included.

Moreover, H pixels=L pixels (long side=short side) may be possible.

A resolution of this area sensor is determined by a distance N among the sensor components for a pixel.

The area sensor used in a high resolution digital camera includes a considerable number of pixels as the number of the sensor components for a pixel in the long-side direction and the number of the sensor components for a pixel in the short-side direction. For example, there is a ten million-pixel class digital camera having 3800 pixels as the sensor components for a pixel in the long-side direction and 2800 pixels as the sensor components for a pixel in the short-side direction.

Generally, when the area sensor is used in the camera or the like, the area sensor captures and picks up input image data as a two-dimensional region.

In other words, image pickup is performed by using the sensor components for a pixel arranged in a two-dimensional array, in one image pickup.

When the area sensor device is mounted in the reader, the sensor components for a pixel are arranged without inclination in order to provide the picked-up image data as an image without distortion in a lateral direction and a longitudinal direction.

Therefore, the arrangement is performed so that no shift exists in a diagonal direction if the picked-up image is reproduced.

For example, if the area sensor has been attached within a common camera, image data read by the sensor components for a pixel at a line illustrated by a black frame 1403 is image data configuring a most upper end section of a picked-up object.

At this time, the read image data has no inclination in a direction in which the line is configured.

Similarly, image data read by the sensor components for a pixel at a line illustrated by a black frame 1404 is image data at a position which is different from a picked-up object position read by the black frame 1403, that is, at a position lower in the vertical direction. Thus, a black frame 1405 provides image data at a position which is four lines lower than an image pickup position read by the black frame 1403 in the vertical direction.

In this way, when the area sensor in the digital camera is used, in order to pick up the image data as the two-dimensional region, all of the sensor components for a pixel configuring the area sensor pick up different positions of the picked-up object.

However, a method of using the area sensor in the apparatus used in this embodiment is different from a usage method in the digital camera as described above.

First, the area sensor illustrated in FIG. 14 is attached at a reference installation position in the reader.

In an image processing apparatus which performs common printing, when the original document image is placed at a designated position on the platen 104 in FIG. 1, the reflected light from the light emitted to the original document image by the light source running parallel in the same direction as a longitudinal direction of the original document image under the original document image, is collected to the sensor. This reflected light is captured so that the reflected light may not be inclined with respect to the sensor.

The reflected light as one line of the image data obtained by scanning the light source parallel is collected parallel in a lateral direction (long-side direction) of the sensor illustrated in FIG. 14.

Consequently, the sensor is installed at a position at which the original document image can be captured almost without inclination.

The installation position of the sensor for realizing such output of the original document image is referred to as "reference installation position" of the sensor.

For simplification of the description, this description assumes that sensor components for a pixel of 20 pixels in the long-side direction and 10 pixels in the short-side direction are included.

Of course, a structure with the long-side direction=the short-side direction may be possible.

It should be noted that the above described number of the sensor components for a pixel is for description of the use and the configuration of the area sensor in this embodiment, and is not limited to the illustrated number of the sensor components for a pixel.

In fact, of course, the configuration with the number of the sensor components for a pixel used in the digital camera may be possible.

The reading unit 105 including the area sensor 113 implemented in the reader is driven in a direction of an arrow illustrated in FIG. 1 so as to read the original document image 103 placed on the platen 104.

In other words, a reading operation is performed by handling the reading line sensors 1404 and 1405 which are sets of the sensor components for a pixel, as if the reading line sensors 1404 and 1405 were the above described line sensors.

Next, how line image data read by the reading line sensors 1404 and 1405 is changed will be described.

Figure 15:
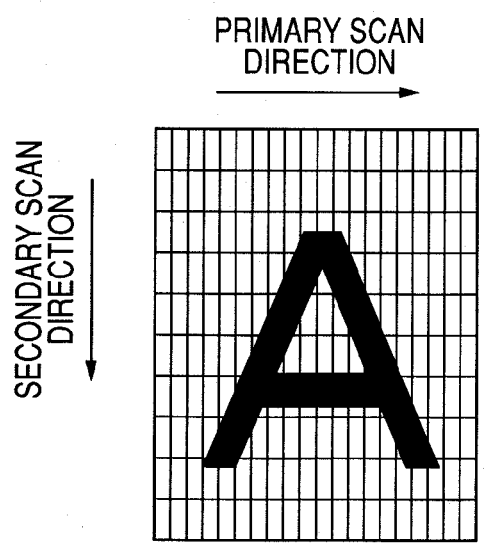
FIG. 15 is an original document image to be read by the area sensor.

The original document image to be read in this description is assumed to be FIG. 15.

In other words, this original document image corresponds to the original document image 103 in FIG. 1.

Moreover, in the same figure, a pixel configuration corresponding to resolutions of the sensor components for a pixel configuring one of the reading line sensors 1404 and 1405 is illustrated by lattices.

The reading unit 105 is driven to move under the original document table in the secondary scan direction, while frame image data input to the reading line sensors 1404 and 1405 is sequentially read.

In other words, in the original document image, a portion which is at a position of the reading unit 105 and corresponding to a line width is gradually read.

This process of reading the original document image will be described.

Figure 16:
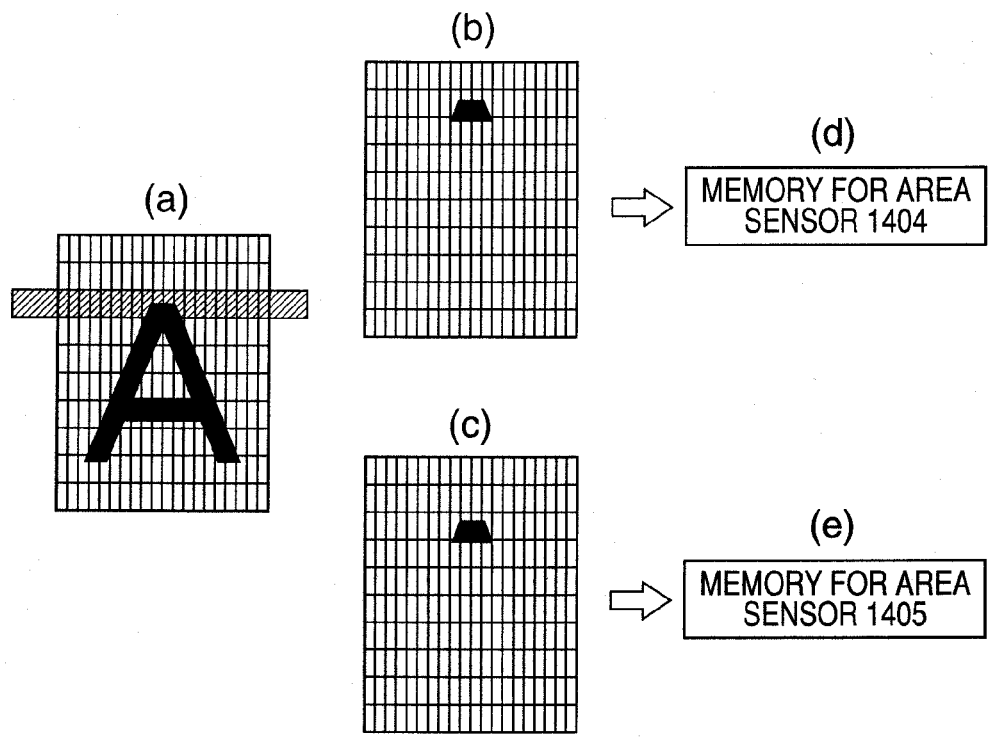
FIG. 16 is a diagram illustrating a method of obtaining line image data.
Figure 17:
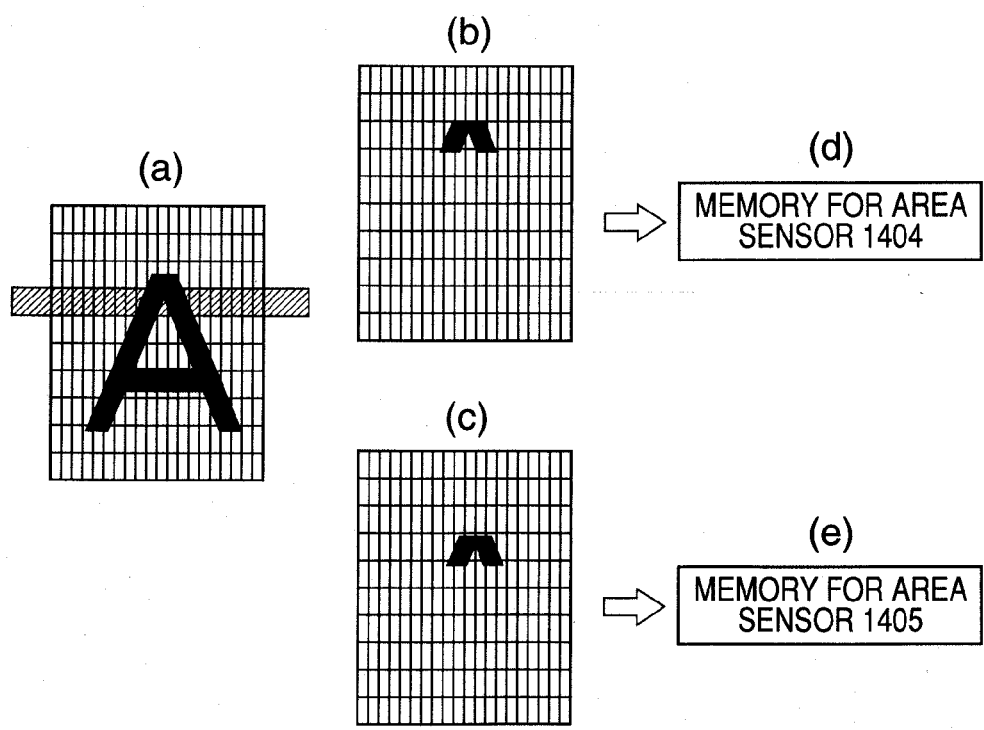
FIG. 17 is a diagram illustrating the method of obtaining the line image data.
Figure 18:
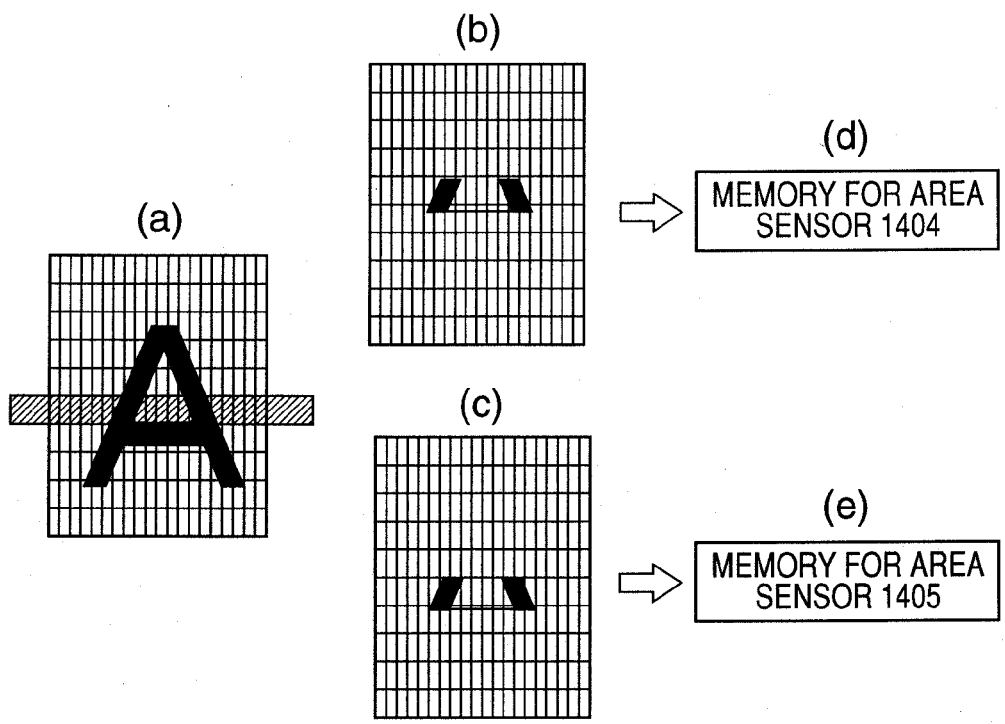
FIG. 18 is a diagram illustrating the method of obtaining the line image data.
Figure 19:
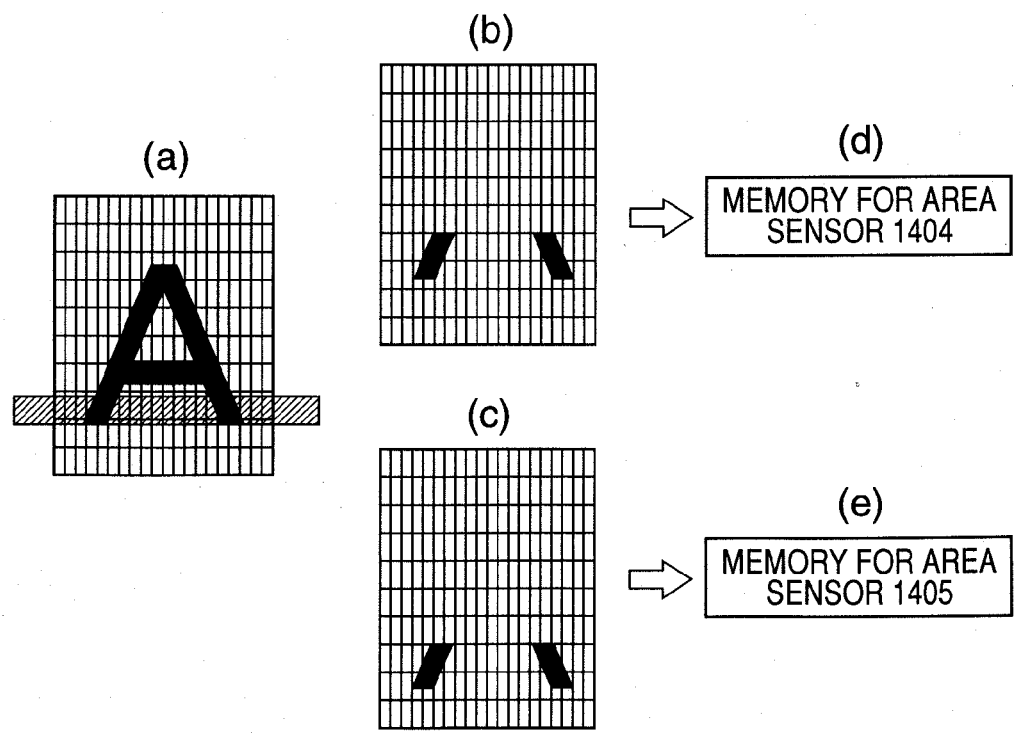
FIG. 19 is a diagram illustrating the method of obtaining the line image data.

When the reading unit 105 moves under the original document table in the secondary scan direction, the light from the light source illuminates shaded portions in the original document image as illustrated in (a) of FIG. 16, (a) of FIG. 17, (a) of FIG. 18, and (a) of FIG. 19.

First, at a certain moment, the light from the light source illuminates the shaded portion of (a) of FIG. 16.

Then, the area sensor senses the light, and senses image data of the line width portion, which is the portion illuminated by the light, in the original document.

For example, at this time, the line sensor 1404 senses image data as illustrated in (b) of FIG. 16.

Simultaneously, the line sensor 1405 senses image data as illustrated in (c) of FIG. 16.

There is a shift in the reading position between two pieces of the line image data because the two line sensors have been installed at a physical distance.

Then, the read line image data is handled as different line image data for each reading line sensor, and separately stored in storage media such as memories as illustrated in (d) and (e) of FIG. 16.

Next, the reading unit 105 moves, the light source moves, and a position in the original document image to be sensed by each line sensor is changed as illustrated in (a) of FIG. 17. Then, the line sensor 1404 senses image data as illustrated in (b) of FIG. 17, and the line sensor 1405 senses image data as illustrated in (c) of FIG. 17.

Then, the read original document image data is handled as different image data for each reading line sensor, and separately stored in the storage media such as the memories as illustrated in (d) and (e) of FIG. 17.

Similarly, when a position illustrated in (a) of FIG. 18 is read, line image data as illustrated in (b) and (c) of FIG. 18 is stored in the storage media such as the memories as (d) and (e) of FIG. 18.

Moreover, when a position illustrated in (a) of FIG. 19 is read, line image data as illustrated in (b) and (c) of FIG. 19 is stored in the storage media such as the memories as (d) and (e) of FIG. 19.

Finally, the entire original document image is illuminated by the light from the light source, and the respective line sensors read the image data at the respective positions.

Figure 20:
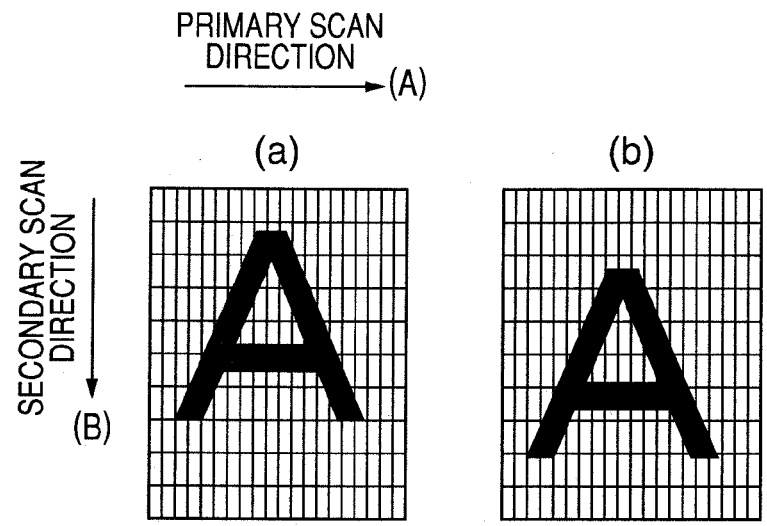
FIG. 20 is image data to be read by line sensors within the area sensor.

Then, the read image data is sequentially stored in the memories, and images as illustrated in (a) and (b) of FIG. 20 are obtained.

At this time, in (a) of FIG. 20, a direction illustrated by an arrow (A) is referred to as "primary scan direction", and a direction illustrated by an arrow (B) is referred to as "secondary scan direction".

As illustrated in (a) and (b) of FIG. 20, a plurality of frames of frame image data in which a shift of one pixel in the secondary scan direction has been caused can be obtained.

As many pieces of this frame image data having the shift in the secondary scan direction as the number of the sensor components for a pixel including sets of the line sensors are obtained.

In this way, if the sensor components for a pixel are arranged in a two-dimensional array and used as the area sensor for reading the original document image, a plurality of frames of frame image data in which the phase has been continuously shifted in the secondary scan direction is obtained in one reading operation.

Next, the method of using the area sensor in the apparatus used in this embodiment will be described.

First, the area sensor as illustrated in FIG. 14 is implemented in an inclined manner in the reader.

Figure 21:
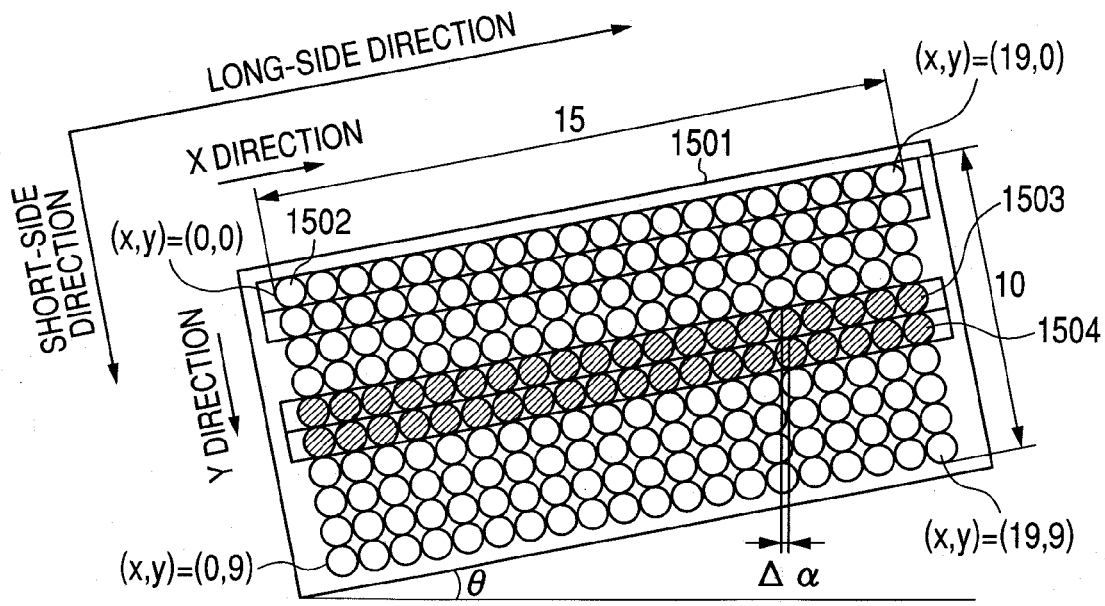
FIG. 21 is a configuration diagram in the case where the area sensor has been diagonally implemented.

FIG. 21 illustrates an example of an implementation form of the area sensor in this embodiment.

There is an area sensor device 1501.

There are sensor components for a pixel 1502, and this description assumes that sensor components for a pixel of 20 pixels in the long-side direction and 10 pixels in the short-side direction are included.

Then, the area sensor is implemented in an inclined manner with respect to the reference installation position, from the reference installation position.

In other words, as illustrated in FIG. 21, the installation is performed at an angle θ from a line sensor which has been installed at the bottom within the area sensor when the area sensor has been installed at the reference installation position.

Positions of the included sensor components for a pixel are assumed to be represented in the long-side direction as an x direction and the short-side direction as a y direction, with an upper left end of the area sensor as an origin.

In other words, coordinates of an upper left end are (x, y)=(0, 0), and coordinates of an upper right end are (x, y)=(19, 0).

Similarly, coordinates of a lower left end are (x, y)=(0, 9), and coordinates of a lower right end are (x, y)=(19, 9).

A set 1503 of one line of sensor components for a pixel configuring the area sensor 1501 specifically includes 20 sensor components for a pixel configuring the long-side direction.

In other words, sensor components for a pixel at coordinate positions (0, 4), (1, 4), (2, 4), . . . (19, 4) are included.

It should be noted that, in the following description, a plurality of the sensor components for a pixel surrounded by the above described set 1503 is referred to as "reading line sensor 1503".

Similarly, a set 1504 includes sensor components for a pixel at coordinate positions (0, 5), (1, 5), (2, 5), . . . (19, 5), and is referred to as "reading line sensor 1504" in the following description.

In this embodiment, the reading unit 105 including the area sensor 113 implemented in the reader is driven in the direction of the arrow illustrated in FIG. 1 so as to read the original document image placed on the platen 104.

In other words, the reading operation is performed by handling the reading line sensors 1503 and 1504 which are the sets of the sensor components for a pixel, as if the reading line sensors 1503 and 1504 were the line sensors as described above.

Next, how line image data read by the reading line sensor 1503 and the reading line sensor 1504 is changed will be described.

The image to be read in this description is assumed to be FIG. 15.

In other words, this original document image corresponds to the original document image 103 in FIG. 1.

Moreover, in the same figure, what is illustrated by lattices corresponds to the resolutions of the sensor components for a pixel configuring one of the reading line sensors 1503 and 1504.

Although the original document image is read as illustrated in FIGS. 16 to 20 as described above, an inclination of θ enables to obtain frame image data which is inclined at the angle θ.

Figure 22:
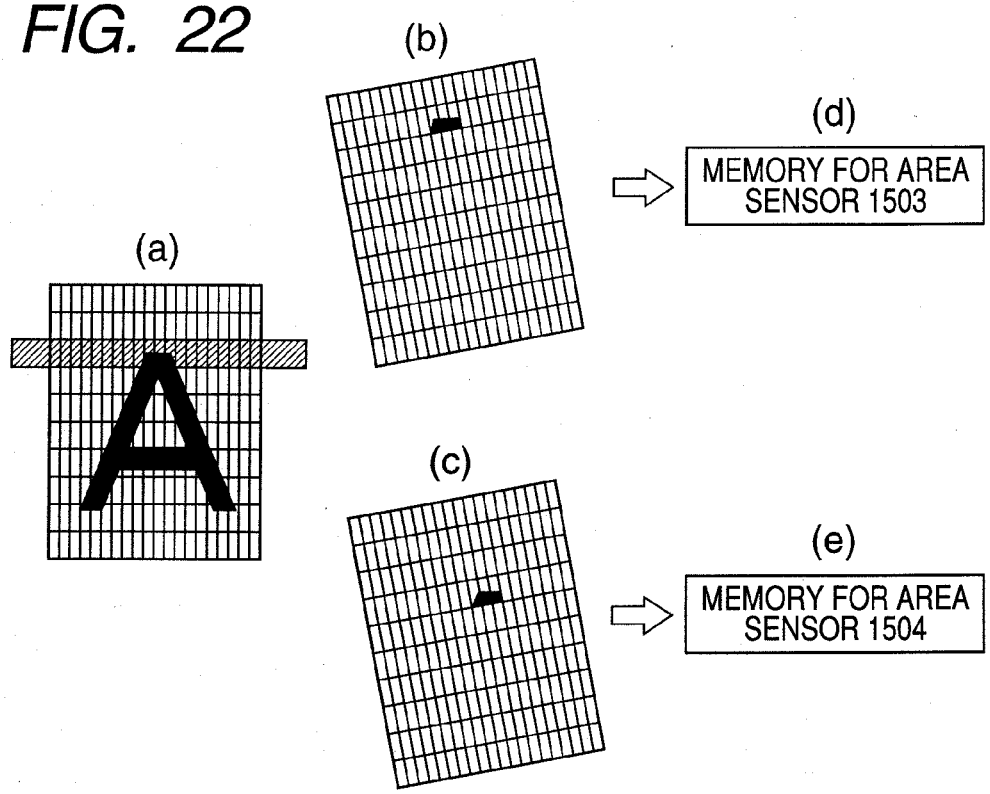
FIG. 22 is a diagram illustrating a method of obtaining the line image data by an inclined area sensor.

For example, if the area sensor is not originally inclined, a position illustrated by a shaded portion in (a) of FIG. 22 should be read. However, since the area sensor is inclined, the line sensors 1503 and 1504 sense image data as illustrated in (b) and (c) of FIG. 22.

Then, these pieces of the line image data, which remain to be inclined, are stored in the storage media such as the memories as illustrated in (d) and (e) of FIG. 22, respectively.

Figure 23:
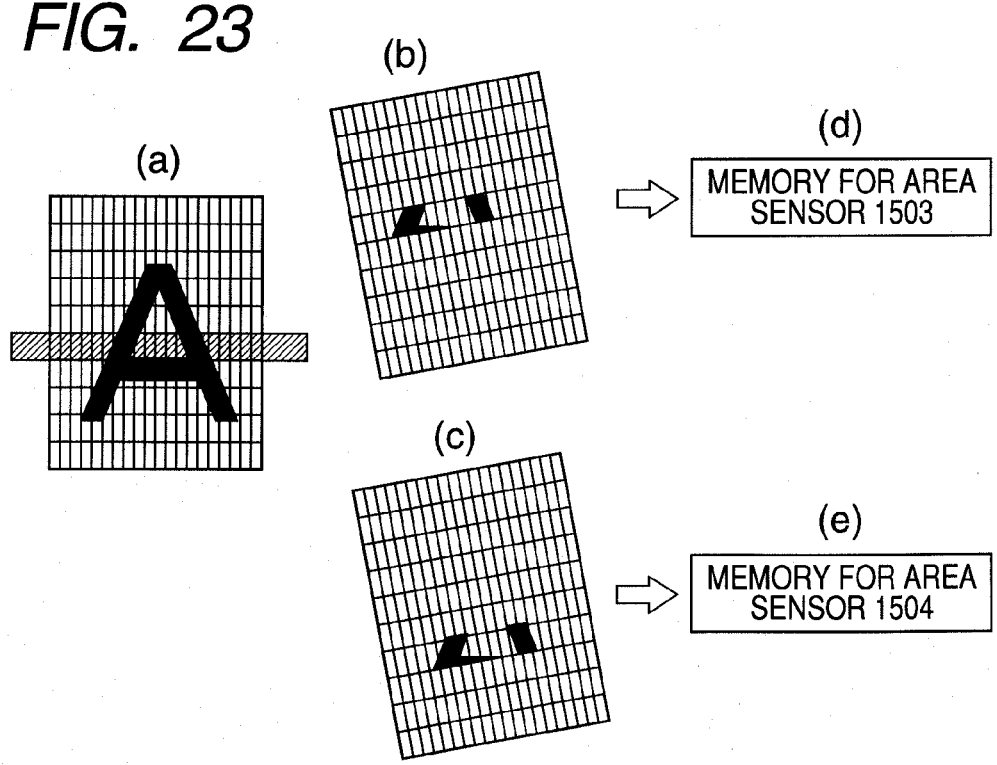
FIG. 23 is a diagram illustrating the method of obtaining the line image data by the inclined area sensor.

Similarly, the reading unit 105 moves, the light source moves, and also a position illustrated by a shaded portion in (a) of FIG. 23 is read. In this case, the line sensors 1503 and 1504 sense image data as illustrated in (b) and (c) of FIG. 23.

Then, these pieces of the line image data are stored in the storage media such as the memories as illustrated in (d) and (e) of FIG. 23, respectively.

Figure 24:
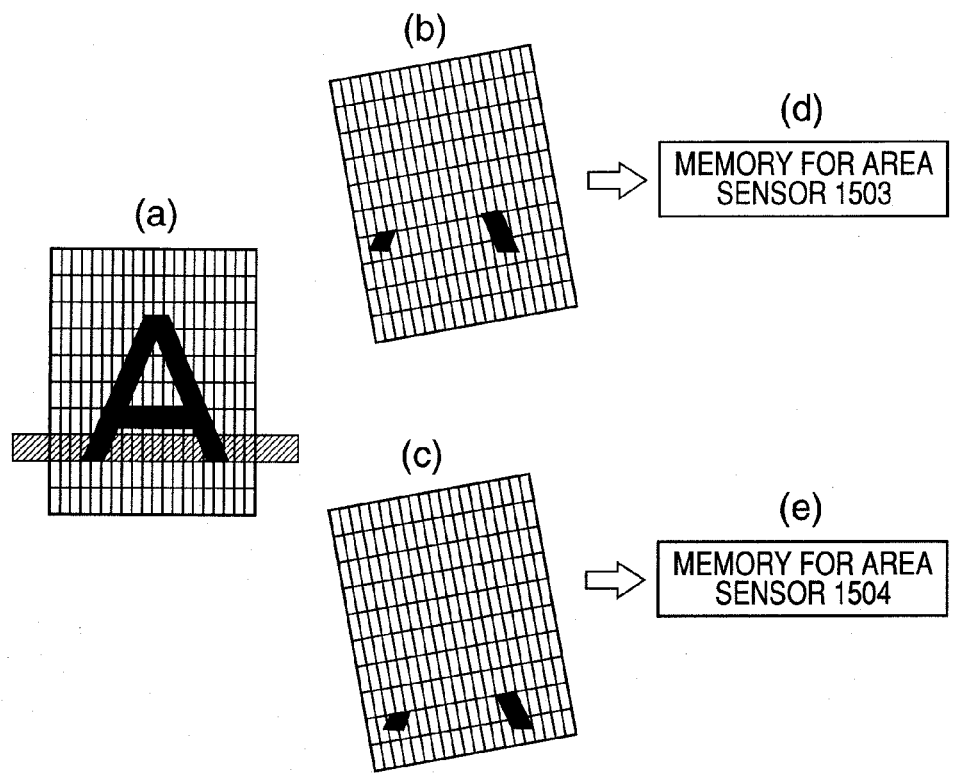
FIG. 24 is a diagram illustrating the method of obtaining the line image data by the inclined area sensor.

Furthermore, along with the movement of the reading unit in the secondary scan direction, if the light source moves and reads a position illustrated by a shaded portion in (a) of FIG. 24, image data illustrated in (b) and (c) of FIG. 24 is obtained by the line sensors 1503 and 1504.

Then, these pieces of the line image data are stored in the storage media such as the memories as illustrated in (d) and (e) of FIG. 24, respectively.

Figure 25:
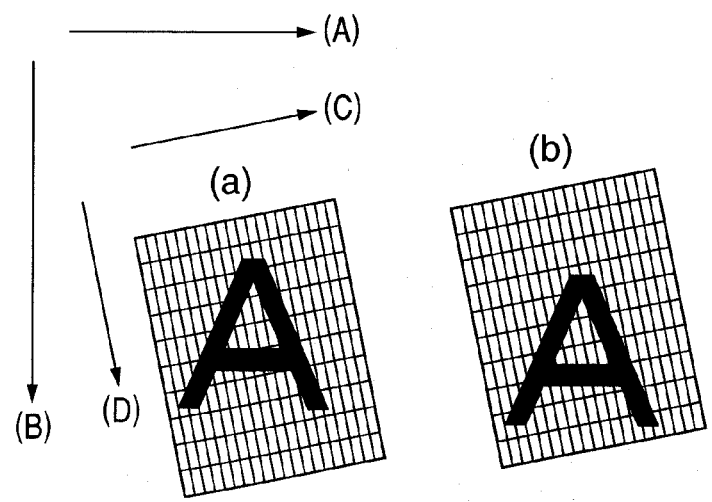
FIG. 25 is image data to be read by the line sensors within the inclined area sensor.

Finally, the line image data sensed and read by the line sensors 1503 and 1504 is data as illustrated in (a) and (b) of FIG. 25. Both pieces of this data are read as the image data which is inclined at the angle θ.

At this time, in (a) of FIG. 25, a direction illustrated by an arrow (A) is referred to as "primary scan direction", and a direction illustrated by an arrow (B) is referred to as "secondary scan direction".

On the other hand, a direction illustrated by an arrow (C) is referred to as "lateral direction" of the read image data.

Moreover, a direction illustrated by an arrow (D) is referred to as "longitudinal direction" of the read image data.

As illustrated in FIG. 21, there is a physical shift of one pixel sensor in the short-side direction between the reading line sensor 1503 and the reading line sensor 1504.

Therefore, there is a phase shift with respect to the short-side direction between the sensor components for a pixel configuring the reading line sensor 1503 and the sensor components for a pixel configuring the reading line sensor 1504.

For example, there is a shift of y=1 in the position in the short-side direction, between a pixel sensor positioned at coordinates (x, y)=(15, 4) in the reading line sensor 1503 and a pixel sensor positioned at coordinates (x, y)=(15, 5) in the reading line sensor 1504.

The shift provides a shift of Δβ with respect to the vertical direction at the reference installation position.

On the other hand, positions in an x-axis direction are completely the same x=15.

However, due to an inclination angle θ, there is a phase shift of a very small amount Δα which is less than or equal to a sub-pixel, with respect to the horizontal direction at the reference installation position.

In other words, even between the sensor components for a pixel at the same position in the x-axis direction within the reading line sensors, if the area sensor is inclined, a phase shift in very small units depending on the inclination angle is caused. This shift depends on the inclination angle.

Therefore, the line image data read by the reading line sensor defined within the area sensor 113 is frame image data having a different phase shift for each line sensor.

Specifically, between the read image data of (a) of FIG. 25 and the read image data of (b) of FIG. 25, there is not only a shift of one pixel in the lateral direction, that is, Δβ in the secondary scan direction, but also a phase shift of Δα in the primary scan direction.

The above description has presupposed two reading line sensors (the reading line sensors 1503 and 1504), which, however, is not limited thereto.

Many reading line sensors may be configured by increasing the sensor components for a pixel configuring the area sensor 113 in the x-axis direction.

In other words, as many reading line sensors as the number of the pixels which configure the area sensor 113 and are arranged in the x-axis direction can be provided.

The number of the configured reading line sensors is equal to the number of pieces of the read image data obtained by one reading operation.

In other words, if 30 lines of the reading line sensors are configured within the area sensor 113, 30 frames of the image data having respective unique phase shifts can be obtained in one reading control.

The frame image data obtained by the inclined area sensor has different, very small phase shifts in the primary scan direction.

Therefore, if the frame image data obtained by the reading control in this way is used, image data with a resolution higher than the resolution of the reading device can be configured according to the super-resolution processing.

However, if the above described method is directly applied to the reader in the multifunction peripheral, an unpreferable situation occurs.

Figure 4:
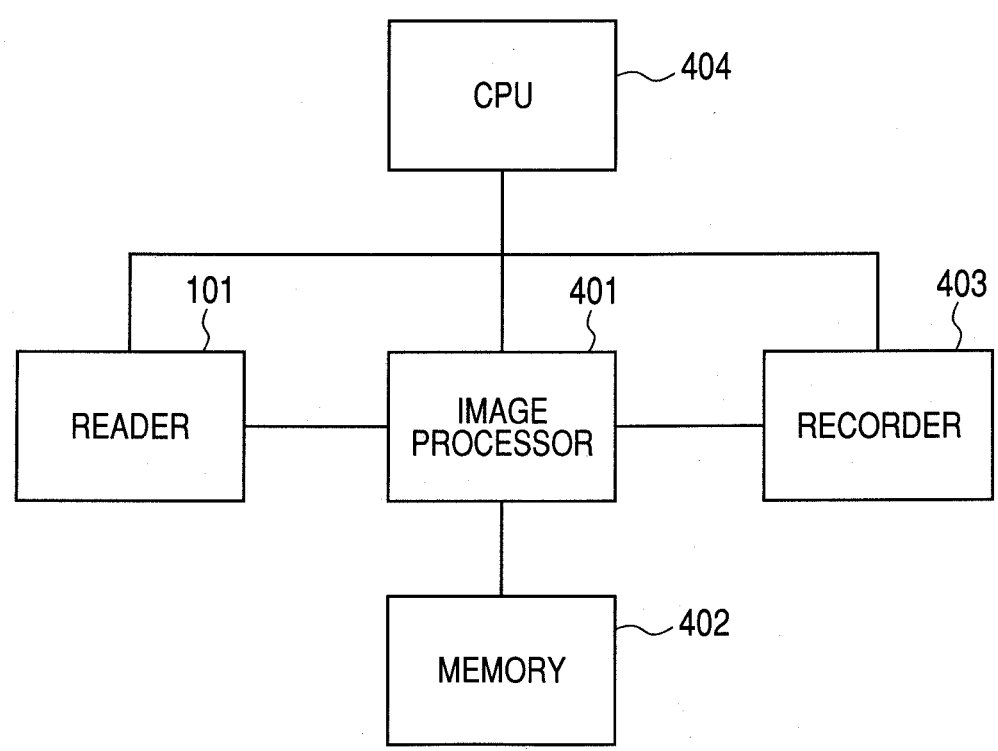
FIG. 4 is a diagram illustrating a configuration of a multifunction peripheral applied with the present invention.

FIG. 4 is a diagram schematically illustrating processing blocks which handle the image in the multifunction peripheral.

In an image processor 401, various kinds of image processing are applied to the frame image data read by the reader 101.

It should be noted that a processing block which performs the super-resolution processing is also included as a part of a configuration of the image processor 401.

A memory 402 is used by the image processor 401 when the image processing is performed.

A recorder 403 includes, for example, a recording engine of one of an ink jet method and an electrophotographic method.

A processor 404 (hereinafter referred to as "CPU") controls the entire multifunction peripheral.

Also as seen from a configuration FIG. 4, the image data read by the reader 101 in the multifunction peripheral is input to the image processor 401.

Usually, processing in the image processor in the multifunction peripheral is targeted for image data which is not inclined in the horizontal direction.

Consequently, in a conventional multifunction peripheral, there is a processor which performs skew correction within the reader 101. There are several skew correction methods which are broadly classified into mechanical correction and electrical correction.

When the original document image is fed to the reading position by the ADF 102, the mechanical correction is realized by causing the original document image to hit an abutment once so as to be horizontal with respect to the reading unit, before the reading is started.

Figure 5:
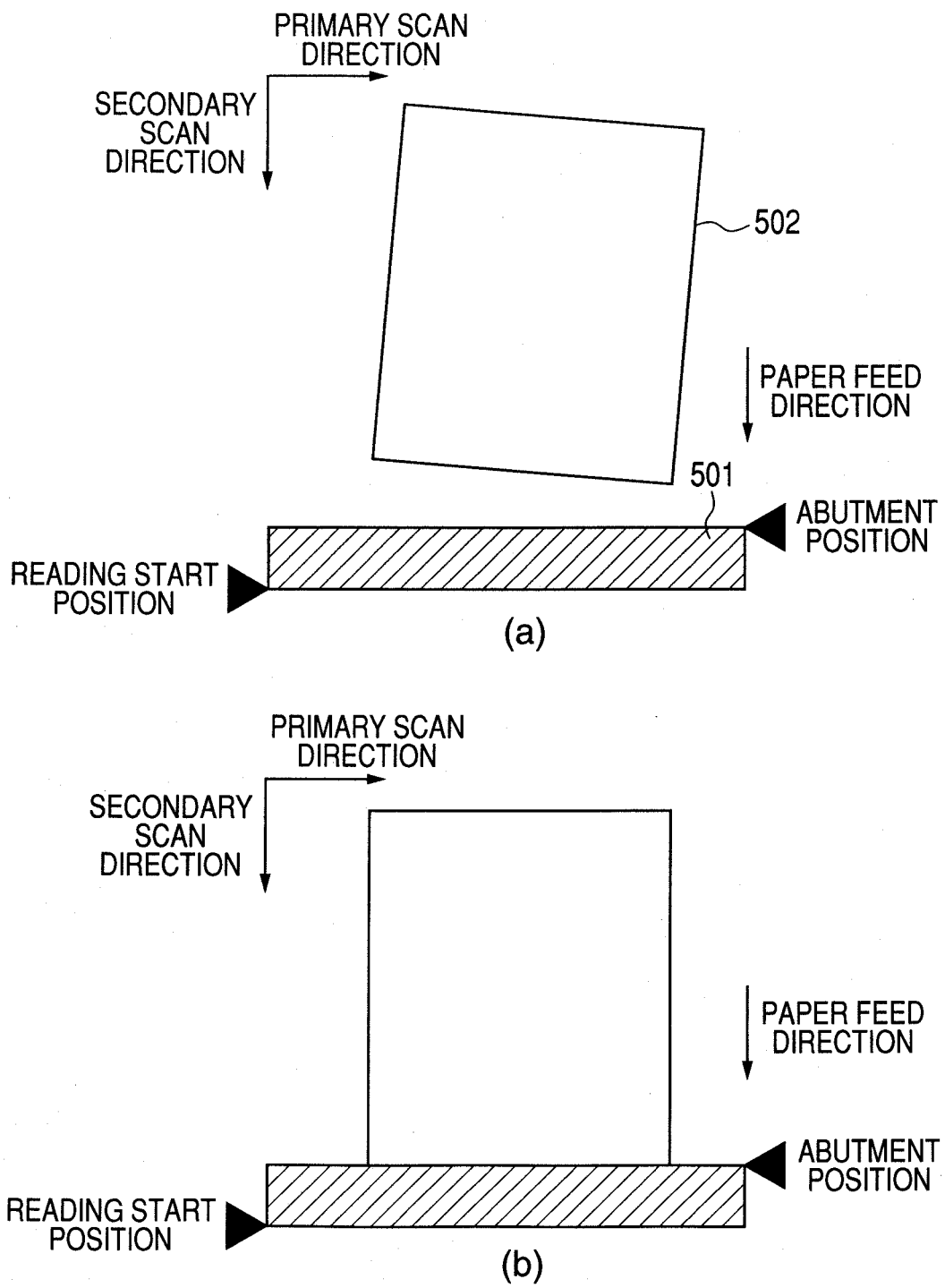
FIG. 5 is a diagram describing mechanical skew correction.

FIG. 5 illustrates an outline of a configuration in the case where the mechanical correction is performed, which is seen from an upper section of the apparatus. An abutment 501 is mechanically provided, and an original document image 502 is fed from the ADF.

Moreover, the primary scan direction is illustrated in the horizontal direction, and the secondary scan direction is illustrated in the vertical direction. A paper feed direction for the original document is the secondary scan direction, which is from top to bottom in the same figure.

The fed original document image 502 is fed to the original document reading position by a roller (not illustrated) or the like, but is caused to hit the abutment 501 before the reading is started. For example, as illustrated in (a) of FIG. 5, when the original document image is diagonally fed, the original document image hits the abutment 501 so as to be corrected to be horizontal with respect to a reading start position ((b) of FIG. 5).

The electrical correction stores all read image data in the memory 402 once, and analyzes the stored read image data so as to obtain the inclination angle.

Then, depending on the obtained inclination angle, two-dimensional coordinate transformation is applied to all read image data. A conversion method which is often used as a two-dimensional coordinate transformation method includes affine transformation (Formula (1)).

$$[X', Y'] = [X, Y]\begin{bmatrix} \cos\theta & \sin\theta \\ -\sin\theta & \cos\theta \end{bmatrix} \quad (1)$$

X', Y': Coordinate position after conversion
X, Y: Coordinate position before conversion The skew correction method is selected depending on the performance of the multifunction peripheral.

In other words, in the high-performance multifunction peripheral, since the reading speed is high, the mechanical correction in which the abutment is hit once causes a significant drawback to achieving the performance. Therefore, the electrical correction is selected.

On the other hand, if a reduced memory capacity is required, the mechanical correction method is often selected.

This embodiment is characterized in that the area sensor 113 is implemented in an inclined manner so as to obtain a plurality of pieces of frame image data having very small phase shifts in the primary scan direction.

Thereby, prerequisites for performing the super-resolution processing can be fulfilled.

Moreover, since the area sensor 113 is intentionally inclined to cause the very small phase shift and the original document image is read, the mechanical correction is not selected.

In other words, the electrical correction is selected.

There are two methods of performing the electrical correction on the premise of the super-resolution processing.

One is to store the plurality of pieces of the image data, which has been read by a plurality of the reading line sensors configured within the area sensor 113, once, and to use a plurality of pieces of inclined image data which has been stored, to perform the super-resolution processing.

In this case, the image data configured by the super-resolution processing becomes high resolution image data having the inclination of the area sensor 113.

Therefore, the skew correction must be performed for the configured high resolution image data before being output to the image processor 401.

In the electrical correction, the inclination angle is calculated from a state of being stored in the memory 402, and conversion which corrects the calculated angle is performed.

If the skew correction is performed after high resolution configuration is performed by the super-resolution processing, whether a unit which performs the correction is hardware or software, a used memory capacity increases depending on a corresponding upper limit resolution.

In other words, if a high resolution image of 2400 dpi, 4800 dpi or the like is handled by the multifunction peripheral, the used memory capacity becomes very large.

Another method is a method of performing the skew correction at a stage prior to the super-resolution processing.

In this case, since the correction may be performed for inclined image data of a primary scan direction resolution of the area sensor 113, the used memory capacity can be reduced more than the above described method.

However, the super-resolution processing requires many pieces of inclined frame image data.

Therefore, the skew correction must be performed for obtained frames, as processing at the prior stage for performing the super-resolution processing.

If the skew correction has been realized in software with a single processor, the processing must be sequentially performed, causing a performance problem.

Moreover, in the case of realization in hardware, when a configuration for performing parallel processing is employed to improve the performance, a circuit size and an accompanied memory capacity increase, which increases a system load.

Consequently, in this case, in order to obtain a non-inclined image from the area sensor which has been installed in an inclined manner, only sensor components for a pixel which can form the non-inclined image are selected from the sensor components for a pixel within the inclined area sensor and used for reading an actual image.

FIG. 2 illustrates the configuration of the area sensor implemented in the reader in this embodiment.

(a) of FIG. 2 is a configuration in the case where the used area sensor 113 has been arranged in the horizontal direction without inclination. This diagram illustrates the case where the area sensor 113 has been arranged at the reference installation position.

(b) of FIG. 2 is a diagram illustrating a configuration in the case where the area sensor 113 has been implemented at the inclination angle θ in the reading unit 105.

In (a) and (b) of FIG. 2, circles illustrate sensor components for a pixel at four corners of the area sensor 113. A pixel sensor at an upper left part of the area sensor 113 is Pa, a pixel sensor at an upper right part is Pb, a pixel sensor at a lower left part is Pc, and a pixel sensor at a lower right part is Pd.

A distance 201 of an upper part of the area sensor 113 is also defined as a width as a device of the image pickup device. Moreover, this width can also be defined as a resolution in the long-side direction of the area sensor 113.

In other words, the distance 201 can be represented as the number of the sensor components for a pixel in the long-side direction.

Similarly, a lower part 202 of the area sensor 113 illustrates the number of the sensor components for a pixel between the pixel sensor Pc and the pixel sensor Pd.

A distance 203 between the pixel sensor Pb and the pixel sensor Pd in the area sensor 113 illustrates the number of the sensor components for a pixel between the pixel sensor Pb and the pixel sensor Pd.

Similarly, a distance 204 illustrates the number of the sensor components for a pixel between the pixel sensor Pa and the pixel sensor Pc in the area sensor 113.

In other words, a distance around the area sensor 113 can be defined by the resolution of the area sensor 113, the number of the sensor components for a pixel.

Therefore, in the following description, each distance of the area sensor 113 is described as the corresponding number of the sensor components for a pixel.

The inclination angle θ is a value which can be obtained at a time point when the area sensor 113 has been implemented in the reading unit 105 in a process of assembling the multifunction peripheral including this area sensor.

This inclination angle θ is retained as a value unique to the implemented apparatus, in a storage area within the multifunction peripheral.

Hereinafter, a detailed description will be provided by using another figure with a control flow.

Figure 6:
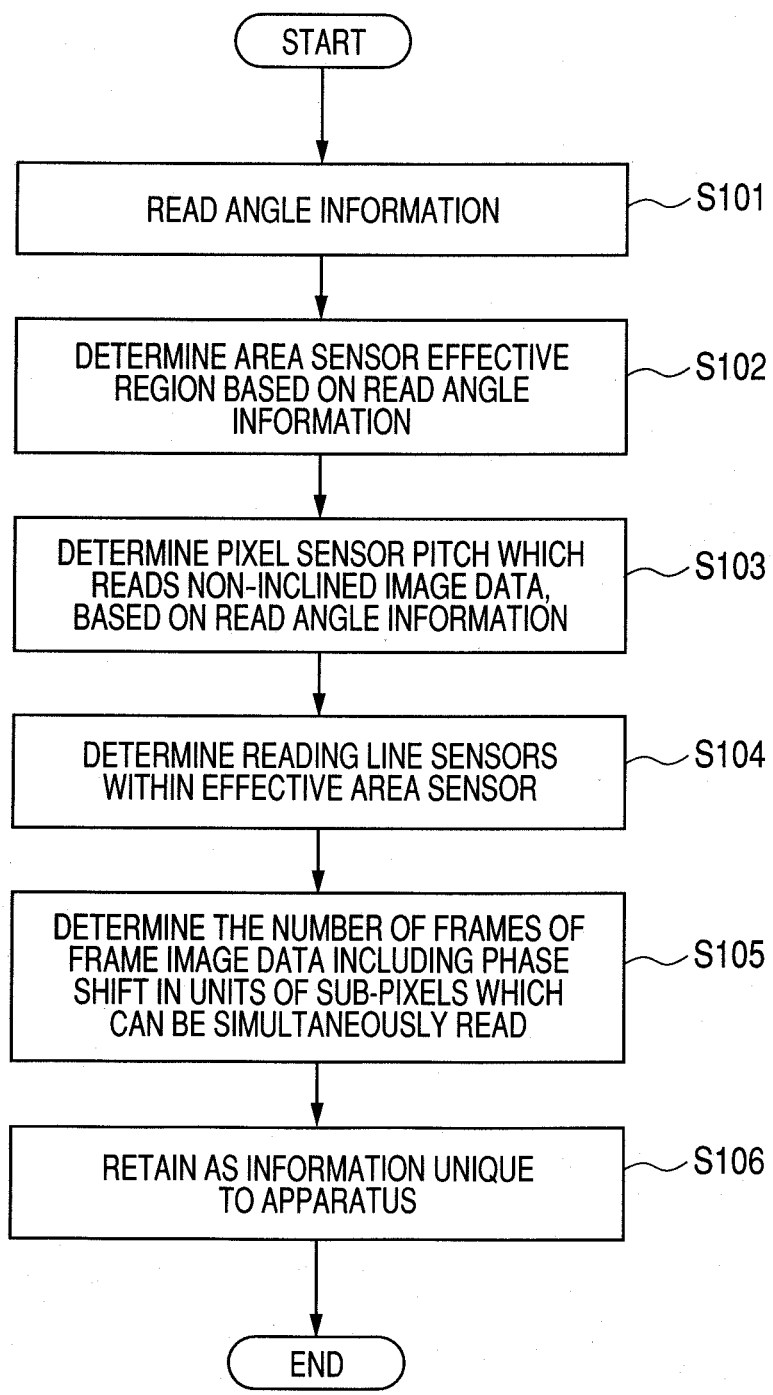
FIG. 6 is a diagram illustrating an operational flow in the first embodiment of the present invention.

FIG. 6 represents a processing flow in this embodiment and illustrates control by the CPU 404 which controls the entire multifunction peripheral.

In (b) of FIG. 2, a crosshatched region illustrates a rectangular region of an inclination angle θ, which is inscribed to the area sensor 113 which has been implemented at the inclination angle θ. It should be noted that vertices of the crosshatched region are Pe, Pf, Pg and Ph, and in the following description, the rectangular region illustrated by this crosshatched region is referred to as "inscribed rectangle".

Among the vertices of the inscribed rectangle, an adjacent point at an upper left part is Pe, an adjacent point at an upper right part is Pf, an adjacent point at a lower left part is Pg, and an adjacent point at a lower right part is Ph.

Moreover, respective distances 205 to 212 are respective distances between a rectangular region to which the area sensor 113 is circumscribed and which is in parallel with the inscribed rectangle and includes the inclination angle 0 (hereinafter referred to as "circumscribed rectangle"), and positions of the sensor components for a pixel Pa, Pb, Pc and Pd at the four corners of the area sensor 113 as contact points.

It should be noted that, among the vertices of the circumscribed rectangle, an adjacent point at an upper left part is Pi, an adjacent point at an upper right part is Pj, an adjacent point at a lower left part is Pk, and an adjacent point at a lower right part is Pl.

Therefore, the distance 205 is a distance between Pa and Pk.

The distance 206 is a distance between Pc and Pk.
The distance 207 is a distance between Pc and Pl.
The distance 208 is a distance between Pd and Pl.
Moreover, the distance 209 is a distance between Pd and Pj.
The distance 210 is a distance between Pb and Pj.
The distance 211 is a distance between Pb and Pi.
The distance 212 is a distance between Pa and Pi.

The CPU 404 in the multifunction peripheral applied with this embodiment first obtains the inclination angle θ in the implementation of the area sensor 113 into the reading unit 105 (step S101).

Specifically, the inclination angle θ retained in the storage area within the multifunction peripheral in the process of assembling the multifunction peripheral is read.

Next, the CPU 404 determines coordinate positions in the inscribed rectangle, which are determined by the inclination angle θ (step S102).

Hereinafter, a process of determining the coordinate positions in the inscribed rectangle will be described.

Since the inclination angle of the area sensor 113 is θ, angles of ∠PiPbPa, ∠PcPaPk and ∠PbPdPj are also θ.

The distances 201, 202, 203 and 204, that is, the numbers of the sensor components for a pixel depend on the resolution of the area sensor 113, and therefore, are values which have been previously determined.

Therefore, for example, the distance 205 (the corresponding number of the sensor components for a pixel) can be represented by the number of the sensor components for a pixel, 204, multiplied by cos θ.

Moreover, the distance 206 (the corresponding number of the sensor components for a pixel) can be represented by the number of the sensor components for a pixel, 204, multiplied by sin θ.

For example, if the number of the sensor components for a pixel corresponding to the distance 204 (the number of the sensor components for a pixel in the secondary scan direction of the area sensor 113) is 2800, and the inclination angle θ=10 degrees, the number of the sensor components for a pixel corresponding to the distance 205 is 2800×0.9848=2757.

Moreover, under the same condition, the number of the sensor components for a pixel corresponding to the distance 206 is 2800×0.1736=486.

In similar consideration, the distance 207 (the corresponding number of the sensor components for a pixel) can be represented by the number of the sensor components for a pixel, 202, multiplied by cos θ.

Moreover, the distance 208 (the corresponding number of the sensor components for a pixel) can be represented by the number of the sensor components for a pixel, 202, multiplied by sine.

If the number of the sensor components for a pixel corresponding to the distance 202 (the number of the sensor components for a pixel in the primary scan direction of the area sensor 113) is 3800, and the inclination angle θ=10 degrees, the number of the sensor components for a pixel corresponding to the distance 207 is 3800×0.9848=2742.

Moreover, under the same condition, the number of the sensor components for a pixel corresponding to the distance 208 is 3800×0.1736=659.

Since ∠PdPbPi, ∠PbPaPk, ∠PaPcPl and ∠PcPdPj are the same angle θ+90 degrees, ∠PiPaPb=∠PaPcPk=∠PjPbPd=∠PlPdPc is known.

Therefore, under a condition of the circumscribed rectangle at the inclination angle θ, a relationship in which 205=209, 206=210, 207=211 and 208=212 is established.

According to the above described calculation method, the numbers of the sensor components for a pixel 209 to 212 are also determined by obtaining the number of the sensor components for a pixel, 205, the number of the sensor components for a pixel, 206, the number of the sensor components for a pixel, 207, and the number of the sensor components for a pixel, 208.

Since the numbers of the sensor components for a pixel 205 to 212 are obtained, vertex coordinates of the inscribed rectangle, that is, coordinate positions Pe, Pf, Pg and Ph within the area sensor 113 are defined. Pa is assumed to be (0, 0), the long-side direction from Pa toward Pb is assumed to be the X-axis direction, and the short-side direction from Pa toward Pc is assumed to be the Y-axis direction.

(c) of FIG. 2 illustrates an enlarged diagram of the Pa and Pe positions. Also as seen from this diagram, an x-coordinate position of Pe within the area sensor 113 is obtained by multiplying the number of the sensor components for a pixel, 206, by cos θ.

Similarly, a y-coordinate position of Pe within the area sensor 113 can be obtained by multiplying the number of the sensor components for a pixel, 206, by sine.

Therefore, if the x-coordinate of Pe is Xpe and the y-coordinate is Ype, Xpe and Ype are obtained by the following calculation formulas (Formulas (2) and (3)).

$$Xpe: \text{(the number of the sensor components for a pixel, 206)} \times \cos \theta \quad (2)$$

$$Ype: \text{(the number of the sensor components for a pixel, 206)} \times \sin \theta \quad (3)$$

Hereinafter, in similar consideration, the coordinate position (Xpf, Ypf) of Pf within the area sensor 113, the coordinate position (Xpg, Ypg) of Pg within the area sensor 113, and the coordinate position (Xph, Yph) of Ph within the area sensor 113 are obtained by the following calculation formulas (Formulas (4) to (9)).

$$Xpf: \text{(the number of the sensor components for a pixel, 212)} \times \sin \theta \quad (4)$$

$$Ypf: \text{(the number of the sensor components for a pixel, 212)} \times \cos \theta \quad (5)$$

$$Xpg: \text{(the number of the sensor components for a pixel, 208)} \times \sin \theta \quad (6)$$

$Ypg$: (the number of the sensor components for a pixel, 204)−(the number of the sensor components for a pixel, 208)×cos θ　　(7)

$Xph$: (the number of the sensor components for a pixel, 201)−(the number of the sensor components for a pixel, 210)×cos θ　　(8)

$Yph$: (the number of the sensor components for a pixel, 203)−(the number of the sensor components for a pixel, 210)×sin θ　　(9)

According to the above described process, vertex coordinate positions of the inscribed rectangle of the area sensor 113 are obtained.

Even if the area sensor 113 is inclined, the inclination of the inscribed rectangle is corrected in the long-side direction, and the inscribed rectangle indicates a region in which non-inclined line image data can be captured (hereinafter referred to as "effective reading region").

Next, in order to read a plurality of pieces of non-inclined line image data having a phase shift of a sub-pixel, the CPU 404 determines an interval among the sensor components for a pixel which are used for reading the line image data, in the sensor components for a pixel within the effective reading region (step S103).

Hereinafter, a detailed description will be provided by using FIG. 3.

(a) of FIG. 3 illustrates an example of the configuration of the area sensor 113 implemented within the reading unit 105.

It should be noted that, in this description, by way of example, the number of the sensor components for a pixel in the long-side direction is assumed to be 20, and the number of the sensor components for a pixel in the short-side direction is assumed to be 10.

(b) of FIG. 3 illustrates coordinate positions of four corners of the sensor components for a pixel configuring the area sensor 113. It is assumed that the long side=the X-axis and the short side=the Y-axis.

Coordinates of an upper left pixel sensor are (x, y)=(0, 0), coordinates of an upper right pixel sensor are (x, y)=(19, 0), coordinates of a lower left pixel sensor are (x, y)=(0, 9), and coordinates of a lower right pixel sensor are (x, y)=(19, 9).

Moreover, θ is the inclination angle of the area sensor 113, and a rectangular region illustrated by a thick line illustrates the region determined as the inscribed rectangle (effective reading region) at step S102.

Next, the CPU 404 calculates what interval among the selected sensor components for a pixel within the effective reading region within the area sensor 113 is required so as to enable to obtain non-inclined frame image data.

Since the inclination angle of the area sensor 113 is θ, the sensor components for a pixel configured within the area sensor 113 also include the inclination of the angle θ among the sensor components for a pixel adjacent in the long-side direction.

The sensor components for a pixel to be used to obtain the non-inclined frame image data within the effective reading region can be calculated back from the above described inclination.

For example, in (b) of FIG. 3, a gray crosshatched pixel sensor A (coordinate position (2, 2)) is set as a reference.

Since an adjacent pixel sensor B is inclined at the inclination angle θ, even though the adjacent pixel sensor B is the pixel sensor within the effective reading region, pixel data read by the pixel sensor A and pixel data read by the pixel sensor B cannot configure horizontal frame image data.

In other words, in order to configure non-inclined pixel data from the pixel data read by different sensor components for a pixel, reading sensor components for a pixel need to be discretely determined.

Specifically, if the sensor components for a pixel have been arranged at the inclination angle θ in the long-side direction, positions of long-side direction sensor components for a pixel shifted by one in the short-side direction may be calculated ((c) of FIG. 3).

Therefore, in the case where the inclination angle is θ, in order to configure the line sensor which is not dependent on θ and in parallel with the horizontal direction at the reference installation position, a pixel sensor interval in the long-side direction is obtained by Formula (10).

(The pixel sensor interval in the long-side direction in the case of the inclination angle θ)=1/sin θ　　(10)

A calculation result of Formula (10) is ideally an integer.

However, because of a calculation of a trigonometric function, if the inclination angle θ is arbitrary for each multifunction peripheral, the selection of the sensor components for a pixel which can read the non-inclined frame image data is difficult.

Therefore, in application of this embodiment, a certain level of range (limit) is provided for the inclination angle θ at which the area sensor 113 is inclined and implemented in the reading unit.

Specifically, the inclination angle θ at which a pixel interval in the long-side direction in the case of the inclination angle θ is an integer is set as an implementation limit.

An example of (b) of FIG. 3 illustrates the case where the pixel sensor interval in the long-side direction is 5.

In other words, a pixel sensor which can read the pixel data read by the pixel sensor A and non-inclined frame pixel data corresponds to a coordinate position which is advanced by five in the long-side direction and by one in the short-side direction.

Specifically, the pixel sensor corresponds to a pixel sensor at a coordinate position (7, 3).

Subsequently, similarly, the sensor components for a pixel which can obtain the non-inclined frame pixel data are selected with the pixel sensor A as the reference.

When the selection of the sensor components for a pixel with the pixel sensor A as the reference (hereinafter referred to as "reference pixel sensor") is completed, the CPU 404 determines the next reference pixel sensor B (coordinate position (2, 3)) and performs similar pixel sensor selection.

It should be noted that, since the inclination angle θ is the same, the pixel sensor interval in the long-side direction is the same as the case of the pixel sensor A as the reference.

Subsequently, with respect to a pixel sensor C and a pixel sensor D, the selection of the sensor components for a pixel for obtaining the non-inclined frame pixel data is repeated.

The above described selection of the sensor components for a pixel defines the reading line sensors for obtaining the non-inclined frame image data.

In other words, the reading line sensor including the sensor components for a pixel with the pixel sensor A as the reference, the reading line sensor including the sensor components for a pixel with the pixel sensor B as the reference, . . . the reading line sensor including the sensor components for a pixel with the pixel sensor D as the reference can be defined.

Next, the CPU 404 determines the number of read frames which can be simultaneously read in one reading operation, that is, by driving of the reading unit 105 (step S105).

For example, in the example illustrated in (b) of FIG. 3, if the reading line sensors with the pixel sensor A, the pixel sensor B, the pixel sensor C and the pixel sensor D as the reference have been defined, the number of the frames which can be read in one reading operation is four frames.

The number of the reading line sensors in this embodiment is determined by the number of the reference sensor components for a pixel selected by the CPU 404.

Consequently, if any reference pixel sensor other than the pixel sensor A to the pixel sensor D is selected, the number of the frames which can be simultaneously read is increased.

In other words, if a pixel sensor belonging to the effective reading region, such as a pixel sensor E at a coordinate position (3, 3) within the area sensor 113, is selected as the reference pixel sensor, the line sensors can be increased by one.

Then, the number of the frames which can be read in one reading operation can be increased.

Moreover, the number of the defined reading line sensors is retained in a storage area (not illustrated) of the multifunction peripheral, as information unique to the apparatus (step S106).

(d) of FIG. 3 illustrates the frame image data read by the reading line sensors with the sensor components for a pixel A to E as the reference.

In the same figure, frame image data 302 has been read by the reading line sensor with the pixel sensor A as the reference. Frame image data 303 has been read by the reading line sensor with the pixel sensor B as the reference.

Moreover, frame image data 304 has been read by the reading line sensor with the pixel sensor C as the reference.

Frame image data 305 has been read by the reading line sensor with the pixel sensor D as the reference.

Frame image data 306 has been read by the reading line sensor with the pixel sensor E as the reference.

The image data 302 to 306 to be read is frame image data read by the reading line sensors including discrete sensor components for a pixel belonging to the effective reading region within the area sensor 113.

Hence, the image data 302 to 306 to be read is the non-inclined frame image data which is not dependent on the inclination angle θ.

Moreover, each read frame image data is the frame image data having the very small phase shift.

In other words, in the first embodiment in this embodiment, the plurality of pieces of the frame image data which has satisfied the conditions of the super-resolution processing can be read.

In addition, negative effects of the inclined area sensor 113 can be eliminated and the inclination can be corrected to obtain lost image data.

This plurality of pieces of the non-inclined frame image data is used to perform the super-resolution processing which performs high resolution conversion in the above described process and output an image with a resolution which is higher than the resolution of the sensor included in the apparatus.

Second Embodiment

Next, a second embodiment will be described.

The change to the high resolution in the read image by the super-resolution processing presupposes obtaining a plurality of frame images having the very small phase shifts, which has been obtained from the original document image.

Moreover, the higher number of frames of the frame image including the very small phase shifts, which have been obtained from the original document image, can improve the resolution of the high resolution image data generated by the super-resolution processing.

The first embodiment has described that the area sensor 113 is diagonally implemented in the reading unit 105 so as to obtain the plurality of frames of the frame image data having the very small phase shifts.

Moreover, in the description, the effective reading region is provided within the area sensor 113, and the sensor components for a pixel within this effective reading region are selected so as to obtain a plurality of frames of the non-inclined frame image data.

However, when the number of the reading line sensors which can be used in the case where the effective reading region has not been defined and the image has been read at the original resolution of the area sensor 113 is compared with the number of the reading line sensors which can be defined as the reading line sensors, the reading line sensors determined in this embodiment is less.

This is because sensor components for a pixel belonging to outside of the effective reading region are not targeted for the reference pixel sensor.

The sensor components for a pixel belonging to outside of the effective reading region are not set as reference pixels, in order to prevent variation in the number of the pixels in the long-side direction of the frame image data read within the effective reading region.

FIG. 7 illustrates a configuration of the area sensor 113 in this embodiment.

It should be noted that the reference sensor components for a pixel targeted in the description of the first embodiment are illustrated in black. In the same figure, all of the sensor components for a pixel illustrated in black can read four pixels of pixel data in the long-side direction.

For example, a pixel sensor illustrated as a pixel sensor F (coordinates (3, 5)) defines the sensor components for a pixel at the pixel sensor interval calculated by the CPU 404 in order to read the non-inclined image data.

Then, in this case, only three pixels of the frame image data in the long-side direction within the effective reading region can be obtained.

In this way, if the sensor components for a pixel out of an effective image region are not used as the reading line sensors, the number of the reading line sensors which can be defined by the CPU 404 is limited.

Hereinafter, high resolution support in this embodiment will be described also by using an operational control flow in the CPU 404.

Figure 9:
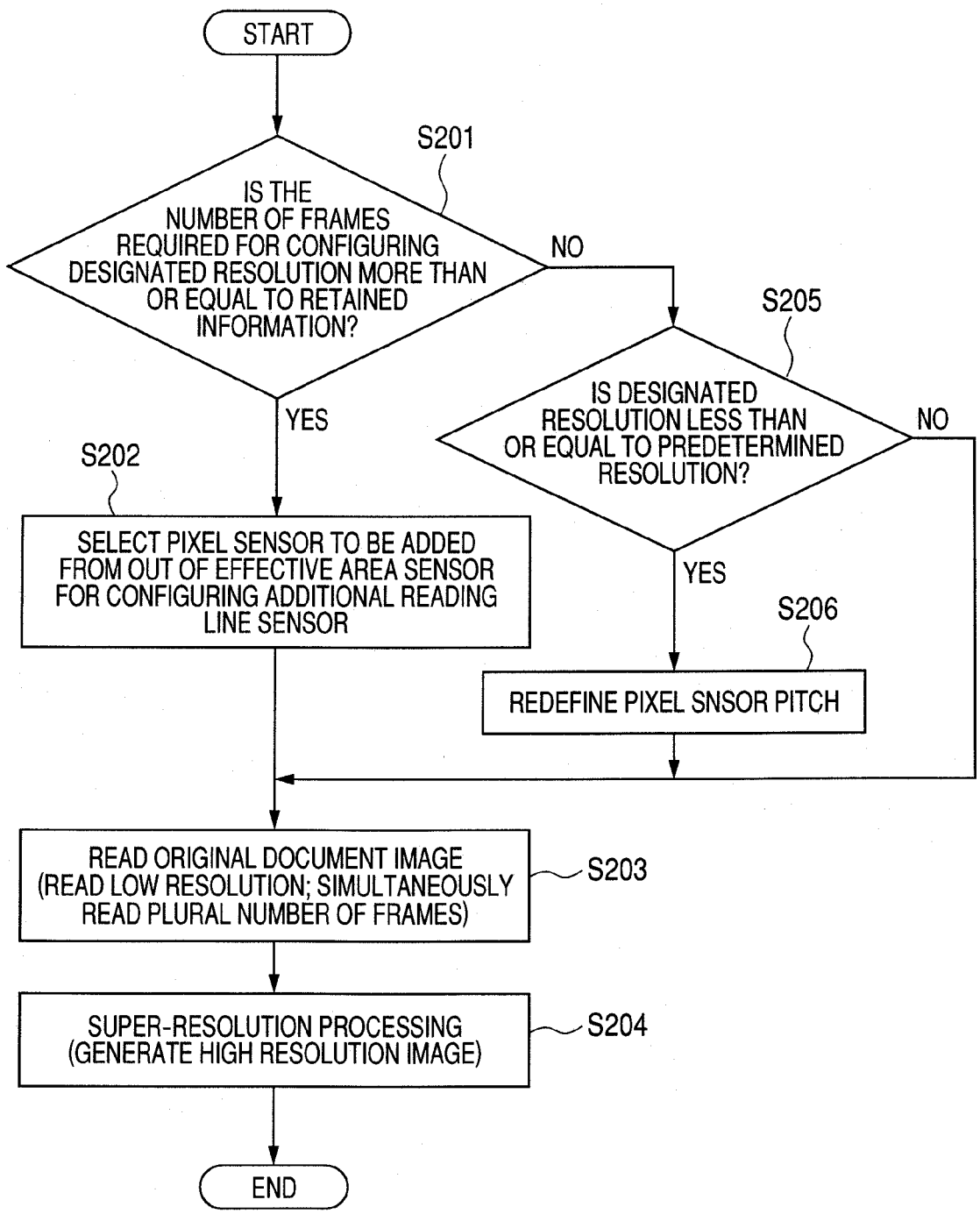
FIG. 9 is a diagram illustrating an operational flow in the second embodiment of the present invention.

FIG. 9 illustrates an operational control flow in the multifunction peripheral applied with this embodiment.

A user using the multifunction peripheral designates an output resolution of the image generated by the super-resolution processing, through an operation panel (not illustrated) or the like. Then, the CPU 404 confirms whether or not frames of low resolution frame image data required for obtaining the designated resolution can be read, and the number of obtainable frames of the frame image data (step S201).

As also described in the description of the first embodiment, the number of the frames of the low resolution frame image data which can be simultaneously read within the effective reading region in the multifunction peripheral has been stored in a storage section within the multifunction peripheral.

Therefore, the CPU 404 compares a stored limit value of the number of the frames of the frame image data which are obtained in one reading operation with the number of the frames of the frame image data required for obtaining the image of the designated resolution.

If the number of the frames of the low resolution frame image data required for configuring the designated high resolution can be compensated by the number of the reading line sensors defined within the effective reading region, the process proceeds to step S203.

Then, the CPU 404 uses the reading line sensors defined within the effective reading region to provide an instruction on the reading operation for the original document image.

A plurality of pieces of read frame image data which has been simultaneously read by the plurality of the defined reading line sensors is output to the image processor 401.

The image processor 401 uses the plurality of the frames of the frame image data output by the reader 101 to perform the super-resolution processing, and configures the high resolution image data as designated by the user.

At step S201, if the number of the frames of the frame image data required for configuring the designated resolution exceeds the number of the frames which can be simultaneously read, which has been stored in the storage section within the multifunction peripheral, the CPU 404 defines a new reading line sensor.

Hereinafter, a method of defining the new reading line sensor will be described by using FIG. 7.

The number of the reading line sensors defined within the effective reading region is not enough to configure the high resolution image having the resolution designated by the user. Consequently, the pixel sensor out of the effective reading region is added to define the new reading line sensor.

For example, the case of the pixel sensor F as the reference pixel sensor will be described.

In order to configure the line sensor which is not dependent on θ within the effective reading region and is in parallel with the horizontal direction at the reference installation position, only three pixels of the non-inclined pixel data, which have been crosshatched in a same manner as the pixel sensor F, can be obtained.

However, a necessary pixel in the long-side direction can be obtained by adding pixel data read by the pixel sensor out of the effective reading region, specifically, a pixel sensor at coordinates (18, 8).

A concept of the read frame image data in this case is illustrated in (b) of FIG. 7.

In the same figure, frame image data read by the sensor components for a pixel within the effective reading region is frame image data with a width of three pixels in the long-side direction.

Moreover, frame image data read by the pixel sensor out of the effective reading region (coordinates (18, 8)) is frame image data with a width of one pixel in the long-side direction.

These two pieces of the frame image data are within and out of the effective reading region, respectively, which is a difference. However, in terms of a very small phase shift in the long-side direction, the two pieces of the frame image data can be regarded to have completely the same phase shift.

Therefore, the two pieces of the frame image data are synthesized so as to obtain necessary frame image data.

In other words, three pixels of the sensor components for a pixel within the effective reading region are added with one pixel of the pixel sensor out of the effective reading region, and defined as the reading line sensor.

Moreover, the definition of the additional reading line sensor is not limited only to the left side and the right side out of the effective reading region.

In other words, sensor components for a pixel on the upper side and the lower side out of the effective reading region may be coupled so as to configure the new reading line sensor.

For example, with a pixel sensor G (coordinates (2, 9)) as the reference pixel sensor, in order to obtain the non-inclined image data, a pixel sensor which is advanced by five in the long-side direction and by one in the short-side direction is targeted.

However, although coordinates (7, 9) which is advanced by five in the long-side direction exist, a pixel sensor (coordinates (7, 10)) which is advanced by one in the short-side direction does not physically exist.

Then, all of the sensor components for a pixel configuring the area sensor 113 are affected by the inclination angle θ.

In other words, in order to obtain the same image as the very small phase shift in the long-side direction, coordinates in the short-side direction may be caused to circulate for one cycle.

Specifically, a pixel sensor at coordinates (7, 0), in which a maximum coordinate position 10 which physically exists is subtracted from a coordinate position 10 in the short-side direction, is defined as a pixel sensor having the same very small phase shift.

Subsequently, similarly to the method as described above, the pixel sensor which is advanced by five in the long-side direction and by one in the short-side direction is defined as the pixel sensor having the same very small phase shift. (c) of FIG. 7 illustrates a conceptual diagram of the read line image data in this definition.

In the same figure, line image data read by the pixel sensor positioned below the effective reading region is image data with a width of one pixel in the long-side direction.

Moreover, frame image data read by the pixel sensor positioned above the effective reading region is line image data with a width of three pixels in the long-side direction.

Similarly to the coupling of the line image data read by the sensor components for a pixel on the left side and the right side of the effective reading region, which has been already described, these two pieces of the line image data can be regarded to have completely the same phase shift, in terms of the very small phase shift in the long-side direction.

Therefore, the two pieces of the frame image data are synthesized so as to obtain the frame image data required as the read pixels in the long-side direction.

In other words, one pixel of the pixel sensor on the lower side out of the effective reading region and three pixels of the sensor components for a pixel on the upper side out of the effective reading region are coupled so as to be defined as the reading line sensor (step S202).

In this way, also in the case where this embodiment has been applied, the number of lines to be read can be increased by adding the pixel sensor to define the new reading line sensor.

In this case, as illustrated in (d) of FIG. 7, the sensor components for a pixel within the effective reading region and the sensor components for a pixel out of the effective reading region are coupled and handled as one set of the line sensors.

Thereby, the line image data obtained by the sensor components for a pixel which have been selected within and out of the effective reading region respectively can be coupled and handled as the low resolution frame image data required for the super-resolution processing.

Moreover, since the low resolution frame image data can be added, the high resolution image data which can include the image data read only by the reading line sensors within the effective reading region can be further improved (steps S203 and S204).

Next, processing in the case where the resolution designated by the user is not so high will be described.

At step S201, if the resolution designated by the user can be realized with the number of the frames of the frame image data stored in the storage section within the multifunction peripheral, the CPU 404 confirms whether or not the designated resolution is less than or equal to a predetermined resolution (step S205).

At step S205, if the CPU 404 has determined that the designated resolution is not less than or equal to the predetermined resolution, the CPU 404 performs processing at steps S203 and S204.

In other words, all of the reading line sensors defined by the CPU 404 are used to simultaneously obtain the plurality of frames of the frame image data (step S203), and the super-resolution processing is executed (step S204).

At step S205, if the CPU 404 has determined that the designated resolution is less than or equal to the predetermined resolution, that is, if not all the resolutions of the reading line sensors defined by the CPU 404 are required, the process proceeds to step S206.

There, the CPU 404 redefines the sensor components for a pixel which can obtain the non-inclined frame image data, and configures the reading line sensors.

FIG. 8 describes a configuration of the redefinition of the sensor components for a pixel which obtain the non-inclined frame image data, and the reading line sensors.

(a) of FIG. 8 illustrates a configuration of the reading line sensors which have been originally defined by the CPU 404, and a pixel sensor H illustrates one of the reference sensor components for a pixel.

Due to the inclination angle θ of the area sensor 113, a pixel sensor which is advanced by five pixels in the long-side direction and by one pixel in the short-side direction is assumed to be the sensor components for a pixel for obtaining the non-inclined frame image data.

Then, a pixel sensor I, a pixel sensor J and a pixel sensor K correspond to sensor components for a pixel having the same very small phase shift as the pixel sensor H.

If resolutions of the pixel sensor H, the pixel sensor I, the pixel sensor J and the pixel sensor K are not required for configuring the resolution designated by the user, the CPU 404 performs thinning of the sensor components for a pixel for obtaining the non-inclined frame image data. For example, as illustrated in (b) of FIG. 8, two of the pixel sensor H and the pixel sensor J are defined as the reading line sensor (step S206).

Moreover, two of the pixel sensor I and the pixel sensor K may be defined as another reading line sensor.

If the resolution designated by the user is not so high, the pixel sensor thinning is performed to further thin the number of the frames of the low resolution frame image data on which the super-resolution processing is based. Thereby, the number of the frame to be simultaneously read is reduced, and the resolutions of the reading line sensors are reduced.

In this way, the memory capacity required for the super-resolution processing can be reduced, and the system load in the multifunction peripheral can be reduced.

It should be noted that, in the above described second embodiment, the sensor components for a pixel or the reading line sensors have been redefined at the stage where the user has designated the resolution. However, the present invention is not limited thereto.

For example, at the stage of the storage into the storage section in the multifunction peripheral, reading line sensors for the high resolution, reading line sensors for normal use, and reading line sensors for the low resolution are previously and separately defined.

Then, a corresponding definition of the reading line sensors may be used at a time point of the designation from the user.

Other Embodiments of the Present Invention

A processing method of storing a program which causes the configuration of the above described embodiment to operate so as to realize functions of the above described embodiment, in a storage medium, reading the program stored in the storage medium, as codes, and executing the codes in a computer, is also included in a category of the above described embodiment. Moreover, of course, the storage medium in which the above described program has been stored, and also the program itself are included in the above described embodiment.

As the above described storage medium, for example, a floppy disk, a hard disk, an optical disk, a magnetic optical disk, a CD-ROM, a magnetic tape, a nonvolatile memory card, and a ROM can be used.

Moreover, operating on an OS and executing the operation of the above described embodiment jointly with a function of another software or expansion board is also included in the category of the above described embodiment, which is not limited to execution of the processing by the program itself stored in the above described storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus in which an area sensor formed by arranging sensor components for a pixel in a two-dimensional array is attached in an inclined manner with respect to a reference installation position, the image processing apparatus comprising:

a sensor unit configured to read, from the sensor components for a pixel which are determined based on an inclination angle indicating an inclination of the area sensor from the reference installation position and have been arranged within the area sensor, image data in which the inclination has been corrected, wherein the area sensor has an effective reading region which is determined based on the inclination angle indicating the inclination of the area sensor from the reference installation position and the number of the sensor components for a pixel configuring a long side and a short side of the area sensor, and wherein the effective reading region is a rectangular region existing within the area sensor installed in an inclined manner with respect to the reference installation position;

an image obtaining unit configured to obtain a plurality of frames of image data having a shift of less than one pixel, by scanning an original document image once by the sensor unit;

a high resolution conversion unit configured to obtain image data with a resolution higher than resolutions of the sensor components for a pixel by using the image data obtained by the image obtaining unit to perform interpolation processing;

an output resolution designation unit configured to receive, from a user, designation of a resolution of an output image when the original document image is output;

a comparison unit configured to compare the number of the frames of the image data required for obtaining the output image with the resolution designated at the output resolution designation unit, with the number of the frames of the image data which can be obtained by the image obtaining unit; and an image data addition unit configured to obtain the image data in which the inclination has been corrected, from the sensor components for a pixel arranged within the effective reading region and the sensor components for a pixel arranged out of the effective reading region, if the comparison unit determines that the number of the frames of the required image data is larger.

2. The image processing apparatus according to claim 1, further comprising
an image data thinning unit configured to obtain the image data in which the inclination has been corrected, from the sensor components for a pixel used by the sensor unit in which the number of the sensors are reduced, if the comparison unit determines that the number of the frames of the required image data is smaller.

3. An image processing method in an image processing apparatus in which an area sensor formed by arranging sensor components for a pixel in a two-dimensional array is attached in an inclined manner with respect to a reference installation position, and which includes a sensor unit which reads, from the sensor components for a pixel which are determined based on an inclination angle indicating an inclination of the area sensor from the reference installation position and have been arranged within the area sensor, image data in which the inclination has been corrected, the image processing method comprising:
obtaining a plurality of frames of image data having a shift of less than one pixel, by scanning an original document image once by the sensor unit;
obtaining image data with a resolution higher than resolutions of the sensor components for a pixel by using the obtained image data to perform interpolation processing, wherein the area sensor has an effective reading region which is determined based on the inclination angle indicating the inclination of the area sensor from the reference installation position and the number of the sensor components for a pixel configuring a long side and a short side of the area sensor, and wherein the effective reading region is a rectangular region existing within the area sensor installed in an inclined manner with respect to the reference installation position;
receiving, from a user, designation of a resolution of an output image when the original document image is output;
comparing the number of the frames of the image data required for obtaining the output image with the designated resolution, with the number of the plurality of frames of the image data which can be obtained in the image data obtaining step; and
obtaining the image data in which the inclination has been corrected, from the sensor components for a pixel arranged within the effective reading region and the sensor components for a pixel arranged out of the effective reading region, if it is determined in the comparing step that the number of the frames of the required image data is larger.

4. The image processing method according to claim 3, further comprising
obtaining the image data in which the inclination has been corrected, from the sensor components for a pixel used by the sensor unit in which the number of the sensors has been reduced, if it is determined in the comparing step that the number of the frames of the required image data is smaller.

5. A non-transitory computer-readable storage medium for storing a program that, when executed by a processor, performs an image processing method in an image processing apparatus in which an area sensor formed by arranging sensor components for a pixel in a two-dimensional array is attached in an inclined manner with respect to a reference installation position, and which includes a sensor unit which reads, from the sensor components for a pixel which are determined based on an inclination angle indicating an inclination of the area sensor from the reference installation position and have been arranged within the area sensor, image data in which the inclination has been corrected, the image processing method comprising:
obtaining a plurality of frames of image data having a shift of less than one pixel, by scanning an original document image once by the sensor unit;
obtaining image data with a resolution higher than resolutions of the sensor components for a pixel by using the obtained image data to perform interpolation processing, wherein the area sensor has an effective reading region which is determined based on the inclination angle indicating the inclination of the area sensor from the reference installation position and the number of the sensor components for a pixel configuring a long side and a short side of the area sensor, and wherein the effective reading region is a rectangular region existing within the area sensor installed in an inclined manner with respect to the reference installation position;
receiving, from a user, designation of a resolution of an output image when the original document image is output;
comparing the number of the frames of the image data required for obtaining the output image with the designated resolution, with the number of the plurality of frames of the image data which can be obtained in the image data obtaining step; and
obtaining the image data in which the inclination has been corrected, from the sensor components for a pixel arranged within the effective reading region and the sensor components for a pixel arranged out of the effective reading region, if it is determined in the comparing step that the number of the frames of the required image data is larger.

* * * * *